United States Patent
Nelson et al.

(10) Patent No.: US 7,522,661 B2
(45) Date of Patent: Apr. 21, 2009

(54) METHOD OF PRODUCING A TWO-DIMENSIONAL PROBABILITY DENSITY FUNCTION (PDF) EYE DIAGRAM AND BIT ERROR RATE EYE ARRAYS

(75) Inventors: Michael A. Nelson, Lake Oswego, OR (US); John E. Carlson, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 653 days.

(21) Appl. No.: 11/189,955

(22) Filed: Jul. 25, 2005

(65) Prior Publication Data
US 2006/0018374 A1    Jan. 26, 2006

Related U.S. Application Data

(60) Provisional application No. 60/591,357, filed on Jul. 26, 2004.

(51) Int. Cl.
*H04B 3/46*    (2006.01)
(52) U.S. Cl. .................. 375/224; 375/150; 375/225; 375/226; 375/228; 375/254; 702/66; 702/69; 702/181
(58) Field of Classification Search ........... 375/224, 375/225, 226–228, 254, 285, 296, 150, 317, 375/371; 702/69–70, 181, 191, 66; 703/2

See application file for complete search history.

(56) References Cited

U.S. PATENT DOCUMENTS

| | | | |
|---|---|---|---|
| 6,275,959 B1* | 8/2001 | Ransijn | 714/705 |
| 7,275,004 B2* | 9/2007 | Casper et al. | 702/66 |
| 7,426,233 B2* | 9/2008 | Richards et al. | 375/150 |
| 2004/0268190 A1* | 12/2004 | Kossel et al. | 714/704 |
| 2005/0031029 A1* | 2/2005 | Yamaguchi et al. | 375/226 |
| 2005/0111536 A1* | 5/2005 | Cranford et al. | 375/226 |
| 2006/0167652 A1 | 7/2006 | Stimple | |
| 2007/0171998 A1* | 7/2007 | Hietala et al. | 375/317 |

* cited by examiner

*Primary Examiner*—Shuwang Liu
*Assistant Examiner*—Hirdepal Singh
(74) *Attorney, Agent, or Firm*—William K. Bucher

(57) ABSTRACT

A method of producing of a two-dimensional probability density function eye diagram and Bit Error Rate eye arrays generates a two-dimensional PDF array of a correlated waveform record of a data pattern under test which is convolved with a two-dimensional probability density function (PDF) array of the uncorrelated jitter and noise in the data pattern under test. The resulting aggregate two dimensional PDF array of the correlated waveform record pattern with uncorrelated jitter and noise is divided into unit intervals and the unit intervals are summed to generated a two-dimensional PDF eye diagram array. The two-dimensional PDF eye diagram is processed to generate a two-dimensional Bit Error Rate eye array.

25 Claims, 26 Drawing Sheets

METHOD OF PRODUCING A TWO-DIMENSIONAL PROBABILITY DENSITY FUNCTION (PDF) EYE DIAGRAM AND BIT ERROR RATE EYE ARRAYS

CROSS-REFERENCE TO RELATED APPLICATION

This application claims the benefit of the U.S. Provisional Application No. 60/591,357, filed Jul. 26, 2004.

BACKGROUND OF THE INVENTION

The present invention relates generally to the generation of eye and bit error rate diagrams and more particularly to producing a two-dimensional probability density function (PDF) eye diagram and a Bit Error Rate eye arrays for display on a display device.

Digital sampling oscilloscopes acquire waveform records of data patterns under test to generate and display eye diagrams representing unit intervals of the data pattern. The digital sampling oscilloscope has sampling circuitry that acquires very accurate data samples of the data pattern under test. However, the eye diagrams are approximations of the probability of any particular data sample being at a particular location due to the limited number of samples acquired by the sampling oscilloscope. These approximation places limitations on the accuracy of the measurement analysis of the eye diagram. The generation of a Bit Error Rate eye from eye diagram data has limited accuracy. To increase the accuracy of the eye diagram and the resulting measurement analysis requires the acquisition of large quantities of data samples of the data pattern under test. Such acquisitions would take days and months of continuous acquisitions.

A Bit Error Rate Tester (BERT) is another type of measurement instrument that acquires data samples of a data pattern under test. The BERT has specialized circuitry that can acquire extremely large records (giga-samples of data) over a relatively short period of time to generate eye diagrams and Bit Error Rate eyes. However, there are tradeoffs between the extremely fast acquisition of data samples and data sample accuracy. The acquisition circuits in the BERT have inferior flatness and frequency response resulting in acquired data samples having inaccurate amplitude levels. These inaccuracies are translated into eye diagrams and Bit Error Rate eyes. The resulting measurement analysis of the eye diagram and Bit Error Rate eye will have these inaccuracies.

What is needed is a method of producing highly accurate two-dimensional probability (PDF) eye diagram and Bit Error Rate eye arrays from a limited number of samples from an oscilloscope or other type of digitizing instrument. The method should accurately represent the data pattern under test and the vertical and horizontal uncertainties (i.e. noise and jitter) in the data pattern. The vertical and horizontal uncertainties should be a statistically accurate representation of these uncertainties. The statistically accurate vertical and horizontal uncertainties should be combinable with the accurate representation of the data pattern under test to produce the accurate two-dimensional probability (PDF) eye diagram and Bit Error Rate eye arrays for displaying as a PDF eye diagram and Bit Error Rate eye.

SUMMARY OF THE INVENTION

Accordingly, the present invention is a method of producing a probability density function eye diagram and a Bit Error Rate eye arrays. The method convolves a two-dimensional PDF array of a correlated waveform record of a data pattern under test and a statistically correct two-dimensional uncorrelated PDF array of the jitter and noise in the data pattern under test. The two-dimensional PDF array of correlated waveform record data pattern is generated by acquiring a correlated waveform record and dividing the record into array elements defined by the unit interval of the data pattern. A one-dimensional array of ideal 1's and 0's logic levels is generated for the unit intervals of the correlated waveform record. Locations having a maximum and zero slope is determined for the correlated waveform record using the maximum and minimum values of the derivative of the correlated waveform record pattern. Multiple sample records are acquired at the zero slope and the maximum slope locations. A Fast Fourier Transform is applied to each of the multiple sample records of the vertical sample records to generate a vertical spectra of the vertical signal content of the uncorrelated vertical waveform records. The periodic components of the vertical signal content are identified from the vertical spectra and removed and the resulting spectra is integrated to determine the standard deviation which represents the random noise in the data pattern under test.

The slew rate of the maximum slope is determined using the multiple samples records acquired at the maximum slope. The amplitude values in each of the multiple sample records are converted to time values and a Fast Fourier Transform is applied to converted time values for each multiple sample record to generate a horizontal spectra of the horizontal signal content of the uncorrelated horizontal waveform records. The periodic components of the horizontal signal content are identified from the horizontal spectra and removed and the resulting spectra is integrated to determine the standard deviation which represents the observed random jitter in the data pattern under test. The true random jitter is determined as a function of the observed random jitter, random noise and the slew rate.

The periodic components in the spectra of the uncorrelated horizontal waveform record are compared to the periodic components in the spectra of the uncorrelated vertical waveform record to identify periodic vertical components in the spectra of the uncorrelated horizontal waveform record. The identified periodic vertical components in the spectra of the uncorrelated horizontal waveform record are removed from the spectra of the uncorrelated horizontal waveform record. An Inverse Fast Fourier Transform is applied to the horizontal signal content spectra containing the periodic components of the uncorrelated horizontal waveform record of the data pattern under test to generate an amplitude voltage waveform. A histogram is generated of the amplitude voltage waveform that represents the periodic jitter in the data pattern under test. The histogram of the periodic jitter is convolved with a Gaussian distribution function having the calculated standard deviation of the random jitter to generate the one-dimensional uncorrelated horizontal probability density function array of the uncorrelated horizontal waveform record representing the jitter in the data pattern under test.

An Inverse Fast Fourier Transform is applied to the vertical signal content spectra containing the periodic components of the uncorrelated vertical waveform record of the data pattern under test to generate an amplitude voltage waveform. A histogram is generated of the amplitude voltage waveform that represents the periodic noise in the data pattern under test. The histogram of the periodic noise is convolved with a Gaussian distribution function having the calculated standard deviation of the random noise to generate the one-dimensional uncorrelated vertical probability density function array of the uncorrelated vertical waveform record representing the noise in the data pattern under test.

The one-dimensional uncorrelated horizontal probability density function array and the one-dimensional uncorrelated vertical probability density function array are multiplied together to generate a two-dimensional probability density function array of the uncorrelated jitter and noise in the data pattern under test. The two-dimensional probability density function array of the correlated waveform record data pattern is convolved with the two-dimensional probability density function array of the uncorrelated jitter and noise in the data pattern under test to generate an aggregate two-dimensional probability density function array of the correlated waveform record pattern with uncorrelated jitter and noise. The aggregate two-dimensional probability density function array of the correlated waveform record pattern with uncorrelated jitter and noise is correlated with the one-dimensional array of ideal 1's and 0's logical levels for the unit intervals of the correlated waveform record. A two-dimensional probability density function 1's eye array is generated by summing the unit intervals of the aggregate two-dimensional probability density function array of the correlated waveform pattern with uncorrelated jitter and noise correlated with the ideal 1's logic values. A two-dimensional probability density function 0's eye array is generated by summing the unit intervals of the aggregate two-dimensional probability density function array of the correlated waveform pattern with uncorrelated jitter and noise correlated with the ideal 0's logic values. The two-dimensional probability density function 1's eye array and the two-dimensional probability density function 0's eye array are added together to generate a two dimensional probability density function eye diagram array. Alternately, the aggregate two-dimensional probability density function array of the correlated waveform record pattern with uncorrelated jitter and noise may be divided into unit intervals and the unit intervals summed together to generate a two-dimensional probability density function eye diagram array.

A Bit Error Rate eye array is generated using the two-dimensional probability density function 1's eye array and the two-dimensional probability density function 0's eye array. The two-dimensional probability density function 1's eye array is upward integrated and downward integrated to generate two-dimensional 1's upward and downward integration arrays. The two-dimensional probability density function 0's eye array is downward integrated and upward integrated to generate two-dimensional 0's downward and upward integration arrays. The two-dimensional 1's upward integration array is added to the two-dimensional 0's downward integration array and the two-dimensional 1's upward and downward integration arrays are added with the two-dimensional 0's downward and upward integration arrays. The added two-dimensional 1's upward integration array and two-dimensional 0's downward integration array is divided by the added 1's upward and downward integration arrays and the two-dimensional 0's downward and upward integration arrays to generate a two-dimensional Bit Error Rate eye array. Alternately, the aggregate two-dimensional probability density function eye diagram array can be radially integrated from the center of the PDF eye array to generate a Bit Error Rate eye array.

The objects, advantages and novel features of the present invention are apparent from the following detailed description when read in conjunction with appended claims and attached drawings.

DETAILED DESCRIPTION OF THE PREFERRED EMBODIMENT

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a digitizing instrument, using terms such as data, values, signal samples, numbers and the like, consistent with the manner commonly employed by those skilled in the art to convey the substance of their work to others skilled in the art. As is well understood by those skilled in the art, these quantities take the form of electrical or optical signals capable of being stored, transferred, combined and otherwise manipulated through mechanical and electrical components of the digitizing instrument; and the term digitizing instrument includes general purpose as well as special purpose data processing machines, systems, and the like, that are stand alone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentation.

Figure 1:
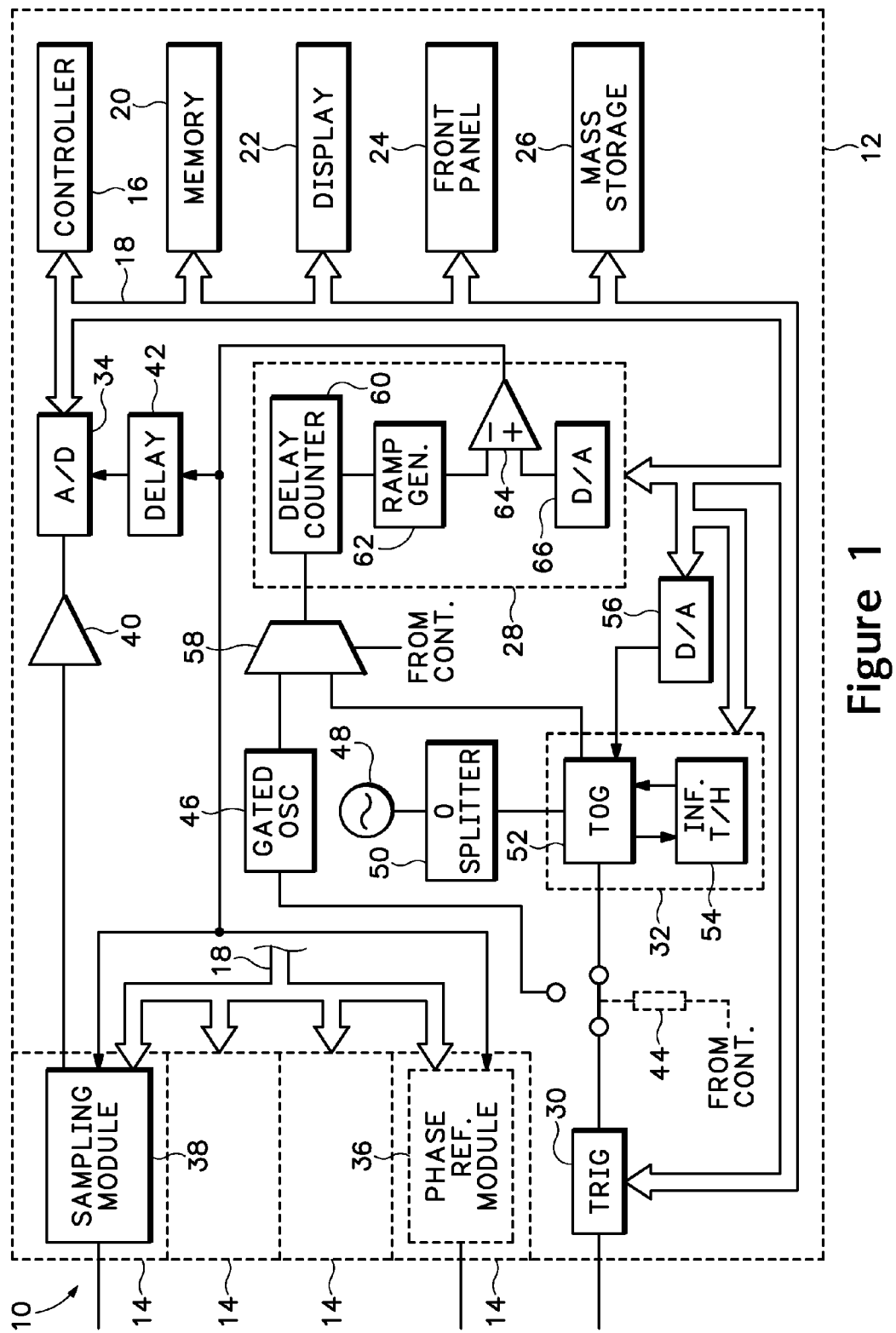
FIG. 1 is a block diagram of a representative digitizing instrument implementing the method of producing of a two-dimensional probability density function (PDF) eye array and Bit Error Rate eye array according to the present invention.

Referring to FIG. 1, there is shown a representative block diagram of a digitizing instrument 10, such as the TDS8200 Digital Sampling Oscilloscope, manufactured and sold by Tektronix, Inc., Beaverton, Oreg., implementing the method of producing of a two-dimensional probability density function (PDF) eye diagram and Bit Error Rate eye of the present invention. The TDS8200 Digital Sampling Oscilloscope 10 has a mainframe 12 and a plurality of module bays or slots 14 that receive various plug-in modules designed for the oscilloscope 10. The mainframe 12 has a main controller 16, such as PENTIUM® or Celeron™ microprocessor, manufactured and sold by Intel, Corp., Santa Clara, Calif. The controller 16 is coupled via a system bus 18 to system memory 20 that includes both RAM, ROM and cache memory with the RAM memory storing volatile data, such as the digitized values representative of the input signal, timebase calibration values, look-up tables and the like. The system bus 18 is also coupled to a display device 22, such a liquid crystal display, cathode ray tube or the like, and front panel controls 24 with buttons, rotatable knobs and the like and/or control entry devices, such as a keyboard and/or mouse. A mass storage unit or units 26, such as a hard disk drive, a CD ROM drive, a tape drive, a floppy drive or the like, that reads from and/or writes to appropriate mass storage media, may also be connected to the system bus 18. The system bus 18 is also coupled to the module bays 14, a strobe generator 28, a trigger circuit 30, a phase startable clock device 32, an analog-to-digital (A/D) converter 34 and digital-to-analog (D/A) converter 56. Program instructions that control the functions of the oscilloscope 10 may be stored and accessed from the ROM memory 20 or from the mass storage media of the mass storage unit 26. The oscilloscope 10 in the preferred embodiment of the invention is a PC based system functioning under the overall control of WINDOWS® 2000 operating system, manufactured and sold by Microsoft, Corp., Redmond, Wash. Controller 16 and system bus 18 in the block diagram are representative of multiple controllers and busses used in the oscilloscope 10. A separate controller is used to control the acquisition of digitized samples with DSP controllers processing the signal samples and passing the processed samples to the control processor for display on display device 22.

The TDS8200 Digital Sampling Oscilloscope 10 is configurable by a user to receive external signals, such as a reference clock, trigger pattern and the like. The TDS8200 Digital Sampling Oscilloscope 10 also has plug-in modules, manufactured and sold by Tektronix, Inc., designed to provide the reference clock and the pattern trigger from the input data pattern signal. Examples of such modules are the 80A05 Electrical Clock Recovery Module and an 80A06 Pattern Sync module. The oscilloscope 10 is also configurable with an 82A04 Phase Reference Module 36 that in conjunction with the phase startable clock device 32 provides femtosecond timing accuracy of the acquired samples. Various electrical or optical sampling modules 38 may be used to acquire signal samples of the data pattern under test, such as the 80E04 Electrical Sampling Module and the 80C08C Optical Sampling Module manufactured and sold by Tektronix, Inc. The oscilloscope may be configured with multiple sampling modules to provide multiple input channels for sampling multiple signals at one time. The various plug-in modules and module bays 14 have interfaces connectors that provide voltage power from the mainframe 12 to the plug-in as well as providing signal lines for coupling signals into and out of the modules and providing system bus connectivity.

The method of producing of a two-dimensional probability density function (PDF) eye diagram and Bit Error Rate eye arrays will now be described using externally provided reference clock and pattern trigger signals. The sampling module 38 receives an optical or electrical input signal having a data pattern to be tested and couples the input signal to sampling diodes within the sampling module 38. The input signal is sampled in response to sampling strobes from the strobe generator 28. The sampling module 38 may include strobe shaping circuitry that shapes the strobe pulses and generates differential strobe pulses. A track-and-hold circuit within the sampling module 38 holds the sampled signal. The signal samples are coupled to a buffer amplifier 40 that conditions the samples for input to the A/D converter 34. The A/D converter 34 converts the analog samples into digital values that are coupled via the system bus 18 to the memory 20 for storage and further processing. The A/D converter 34 is clocked relative to the strobe pulses from the strobe generator 28, such as by delayed strobe pulses coupled through a delay circuit 42.

The trigger circuit 30 receives the external pattern trigger and generates a trigger signal that is coupled to a switching element 44. The switching circuit 44 receives command signals from the controller 16 to couple the trigger signal to the phase startable clock device 32 or a gated oscillator 46. The phase startable clock device 32 also receives phase shifted sinusoidal signal from the continuous wave oscillator 48 via a phase splitter 50. The phase shifted sinusoidal signals are coupled to a triple phase gate 52 in the phase startable clock device 32. The phase gate 52 also receives the trigger signal from the trigger circuit 30. An infinite track-and-hold circuit 54 receives phase values from the triple phase gate 54 and couples replicas of the phase values back to the phase gate 54. A D/A converter 56 is coupled to the triple phase gate 52 to provide offset and gain correction values to the phase startable clock device 32. In the preferred embodiment, the gain and offset correction values are provided by separate D/A converters. The phase startable clock device is described in U.S. Pat. No. 6,384,657 and assigned to the assignee of the instant invention and incorporated in its entirely by reference herein.

The phase startable clock device 32 generates an output signal having a predetermined stable startup phase relative to the trigger input signal. The output signal is conditioned as a clock signal and coupled to one input of a multiplexer or switching circuit 58. The other input of the switching circuit receives a gated clock signal from the gated oscillator 46. The switching circuit 58 selectively couples the gated or phase controlled clock signal to the strobe generator 28 for establishing a coarse time delay increment relative to the trigger pulse. The strobe generator 28 includes delay counter circuitry 60 coupled to receive the clock signal from either the phase startable clock device 32 or the gated oscillator 46. The counter circuitry 60 is coupled via the system bus 18 to the controller 16 that loads coarse time delay values into the counter 60. The output strobe from the delay counter 60 is coupled to a ramp generator 62 that is part of a interpolator circuit 62 providing 0-3 ns time delay change. The ramp generator 62 initiates a ramp signal that is coupled to the minus input of a comparator circuit 64. The plus input to the comparator circuit 64 is an analog signal from a digital-to-analog converter 66. The D/A converter 66 is a 14 bit device that receives digital-to-analog converter (DAC) code values from a horizontal look-up table stored in memory 20. The horizontal look-up table contains DAC values that correct for non-linearities in the interpolator circuit. The output of the strobe generator 28 are strobe pulses provided to the sampling module 38 and the phase reference module 36.

Figure 2:
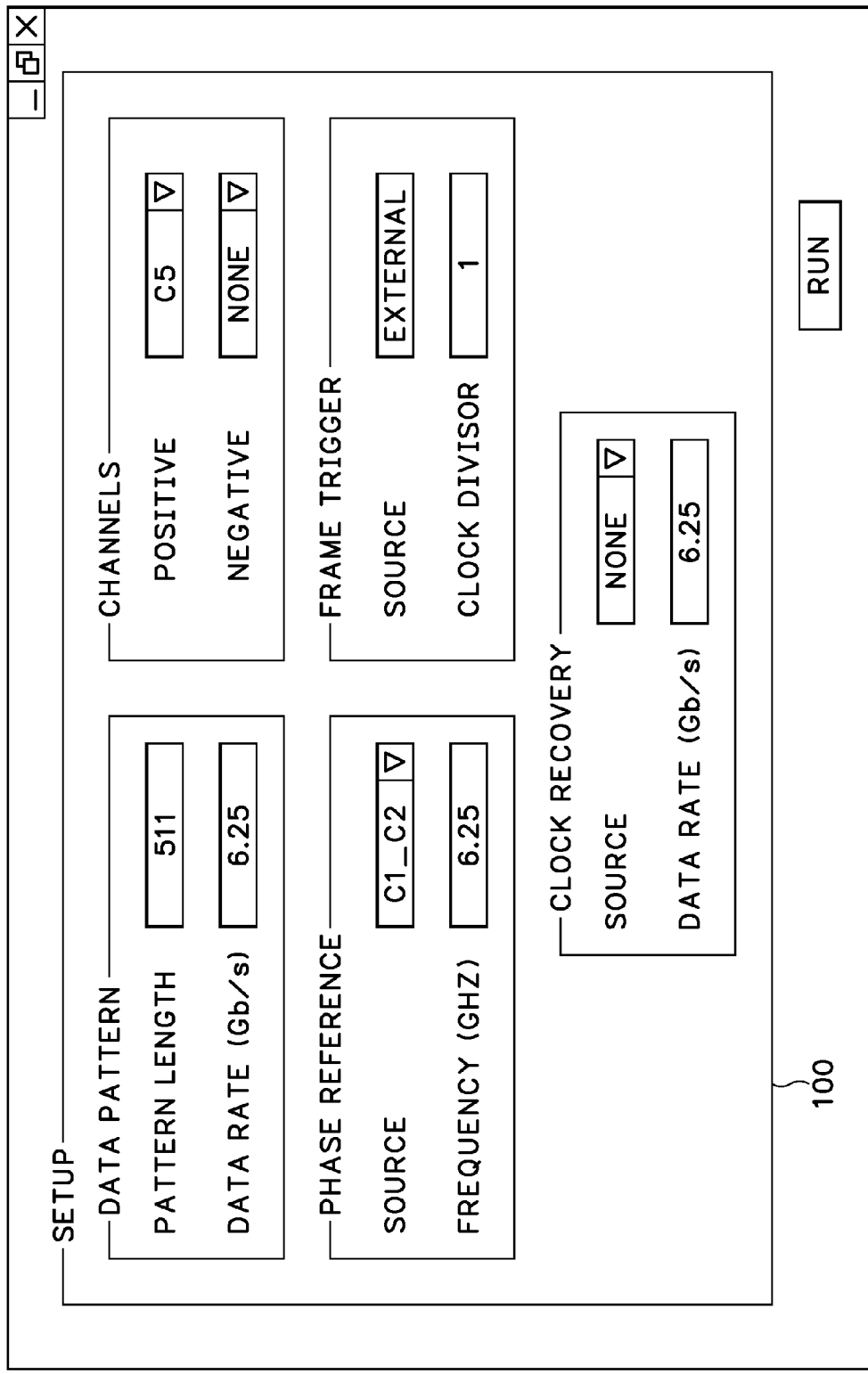
FIG. 2 is a set-up screen for entering parameters for the digitizing instrument.

The method of producing a two-dimensional probability density function eye diagram array will be described in relation to an input signal having a particular data pattern, data rate and clock frequency. The input signal, data pattern, data rate and clock frequency are by example only, and other data patterns, data rates and clock frequencies may be used as well as a differential input signal without departing from the scope of the present invention. Referring to FIG. 2, there is shown a set-up screen 100 displayed on the display device 22 for entering parameters related to the data pattern, data rate and reference clock frequency. In the particular example used to describe the invention, the data pattern is a 6.25 Gb/s PRBS $2^9$-1 pattern. The pattern length for the PRBS $2^9$-1 pattern is 511 and is entered into the PATTERN LENGTH field of the DATA PATTERN box. The data rate of 6.25 Gb/s is entered into the DATA RATE (Gb/s) field of the DATA PATTERN box. The SOURCE fields relate to the modules bay 14 positions in the oscilloscope mainframe 12 and are designated C1_C2, C3_C4, C5_C6 and C7_C8. The sampling module 40 is located in the C5_C6 module bay 14. C5 is selected for the POSITIVE field of the CHANNELS box and NONE is selected for the NEGATIVE field of the CHANNELS box. The 6.25 Gb/s data rate of the pattern signal is entered into the DATA RATE (Gb/s) field of the CLOCK RECOVERY box. Since an external reference is being used, NONE is entered into the SOURCE field. The external reference clock frequency is entered into the FREQUENCY (GHz) field of the PHASE REFERENCE box. EXTERNAL is entered into the SOURCE field of the FRAME TRIGGER box when the frame trigger is from an external source. The clock divisor in the FRAME TRIGGER box refers to the ratio of the frame trigger's input frequency relative to the date rate and is dependent on the particular design of the equipment generating the external frame trigger. For the purposes of the present description, a value of one is entered into the CLOCK DIVISOR filed of the FRAME TRIGGER box.

Once the parameters are entered, the "RUN" button is pressed or highlighted using an external pointing device, such as a mouse. The oscilloscope settings are automatically optimized and samples are acquire of the input signal for a complete analysis of the data pattern. The acquisition of samples occurs in two sets: 1) generating a correlated horizontal and vertical waveform record and 2) generating uncorrelated horizontal and vertical waveform records. In the below description of the invention various terms relating to correlated and uncorrelated data and jitter are used which are defined in the Optical Internetworking Forum's CIE Implementation Agreement Draft 5.0, Document: OIF2003.104.05, titled "Common Electrical I/O—Electrical and Jitter Interoperability agreement for 6G+ bps and 11G+ bps I/O". Additionally, terms similar to jitter are used in defining noise terms.

Figure 3:
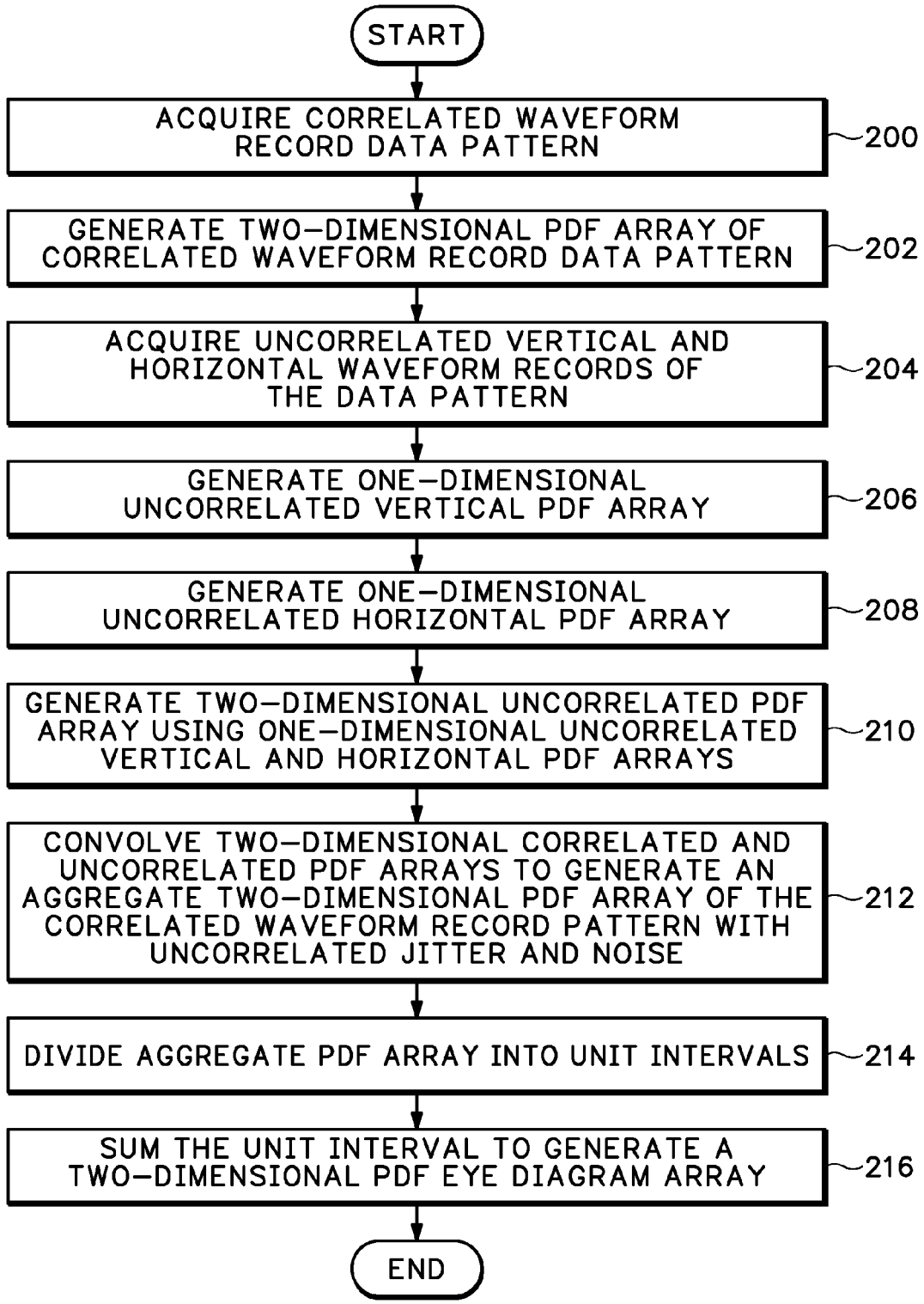
FIG. 3 is a flow chart representing the steps in producing the two-dimensional probability density function (PDF) eye diagram array according to the present invention.

The input signal contains both correlated and uncorrelated content. The correlated content is the actual data pattern in the input signal and the uncorrelated content is the horizontal jitter and vertical noise in the input signal and the instrument. In a first method of producing a two-dimensional probability density function (PDF) eye diagram and Bit Error Rate eye arrays of the present invention involves acquiring a correlated waveform record data pattern of the input data pattern signal as shown in step 200 of FIG. 3. A two-dimensional correlated PDF array of the correlated waveform data patten is generated as represented in step 202. Uncorrelated vertical and horizontal waveform records are acquired at specific location in the correlated waveform record as represented in step 204. The random and periodic vertical signal content of the uncorrelated vertical waveform records is resolved and a one-dimensional uncorrelated vertical PDF array is generated representing the noise in the waveform record pattern as represented by step 206. Likewise, the random and periodic horizontal signal content of the uncorrelated horizontal waveform records are resolved and a one-dimensional uncorrelated horizontal PDF array is generated representing the jitter in the waveform record pattern as represented by step 208. The one-dimensional uncorrelated vertical and horizontal PDF arrays are multiplied together to generate a two-dimensional PDF array of the uncorrelated noise and jitter in the waveform pattern under test as represented by step 210. The two-dimensional PDF array of the correlated waveform record and the two-dimensional PDF array of the uncorrelated nosie and jitter are convolved to generate an aggregate two-dimensional PDF array of the correlated waveform record with the uncorrelated noise and jitter as represented in step 212. The aggregate PDF array is divided into unit intervals as represented by step 214 and the content of the unit intervals are summed to generate a two-dimensional PDF eye diagram array as represented by step 216.

The first step 200 of acquiring a correlated waveform record of the data pattern requires the removal the uncorrelated content in the waveform pattern. This may be accomplished in any number of ways. In the particular embodiment, multiple waveform records of the input signal pattern are acquired, averaged and filtered to remove the uncorrelated content. In addition to averaging and filtering, the waveform record may be further processed to remove other artifacts in the sampled input signal, such as sampler aberrations, interconnect anomalies and the like. In the particular implementation of the invention, each unit interval of the data pattern has 100 samples resulting in a 51.1 k sampled correlated waveform record of the data pattern for the PRBS $2^9$-1 pattern.

Figure 4:
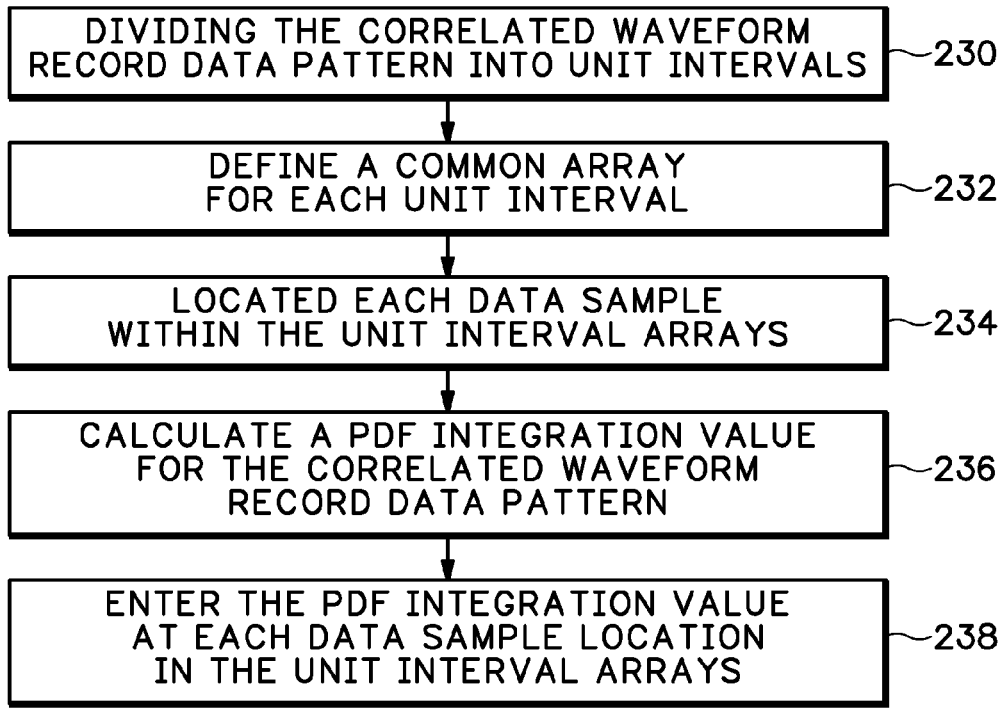
FIG. 4 is a flow chart representing the steps in generating a PDF of the correlated waveform record data pattern.
Figure 5:
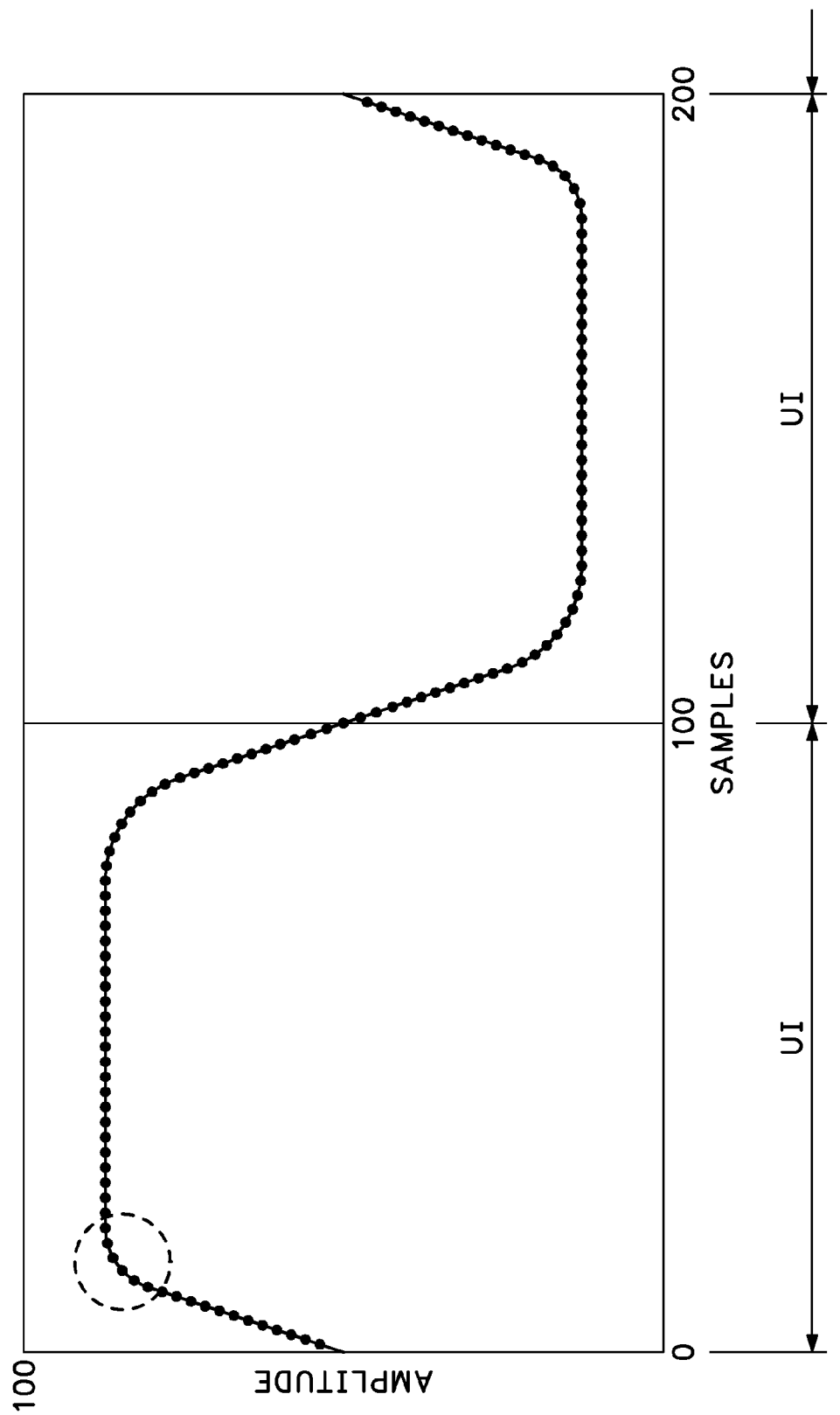
FIG. 5 is a representation of the PDF of the correlated waveform record data pattern.

Step 202 of generating the two-dimensional PDF array of the correlated waveform record starts with dividing correlated waveform record into unit intervals of the data pattern as represented in step 230 of FIG. 4. Each unit interval is then defined as an array as represented by step 232. The number of elements in the array is arbitrary but should be of sufficient size to provide adequate probability density function resolution. In the preferred embodiment, the unit interval array is set to 100×100. The horizontal dimension of the unit interval array is in time defined by the sample interval of the acquired samples. In the particular implementation, there is a one-to one correspondence between the acquired samples and the horizontal elements in the unit interval array. The vertical dimension of the unit interval array is set by the signal being acquired. For example, the vertical dimension for an optical signal may be in watts whereas an electrical signal may be in volts. In the preferred embodiment of the invention, the unit interval array is divided into 100 rows with the vertical location of an acquired sample being determined as vector of the signal amplitude times a scalar divided by 100. A scalar value of 1.2 is used in the preferred embodiment to allow the display of the complete PDF eye diagram. The location of each data sample of the correlated waveform record data pattern is located within each of the unit interval arrays as represented by step 234. A PDF integration value α is generated where the integration of the correlated PDF is equal to 1 as represented in step 236. For a 511 bit data pattern having 100 samples per unit interval, α is 1/51,100. At each data sample location in the correlated PDF, the value of α is entered as represented by step 238. FIG. 5 representatively illustrates the correlated waveform record data pattern divided into 100×100 arrays of unit intervals.

Figure 6:
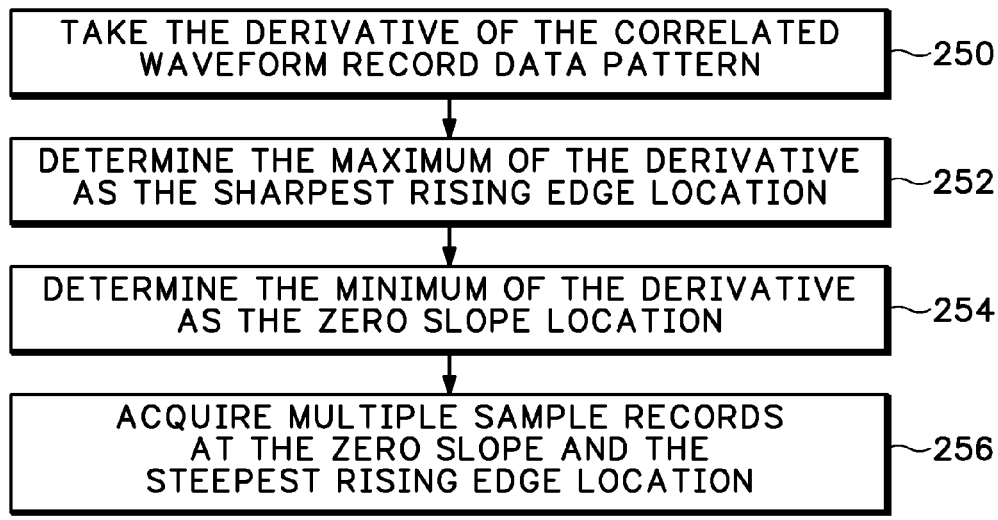
FIG. 6 is a flow chart representing the steps in determining the zero slope and the steepest rising edge location in the correlated waveform record data pattern.

The correlated waveform record is differentiated to determine the sharpest rising edge and the flattest part of the correlated waveform record as represented by step 250 in FIG. 6. The sharpest rising edge is where the derivative goes to a maximum as represented in step 252 and the flattest part of the waveform is where the derivative goes to zero as represented in step 254. Multiple waveform records are acquired at each of the sharpest rising edge and the flattest part of the waveform for processing to determine the random and periodic horizontal and vertical uncertainties in the data pattern as represented in step 256. The random horizontal and vertical uncertainties in the waveform data pattern are respectively referred as jitter and noise. The below described process acquires waveform record samples of the jitter and noise and separates the random jitter and noise components from the periodic jitter and noise components. It is assumed that the random jitter and noise components are Gaussian.

Figure 7:
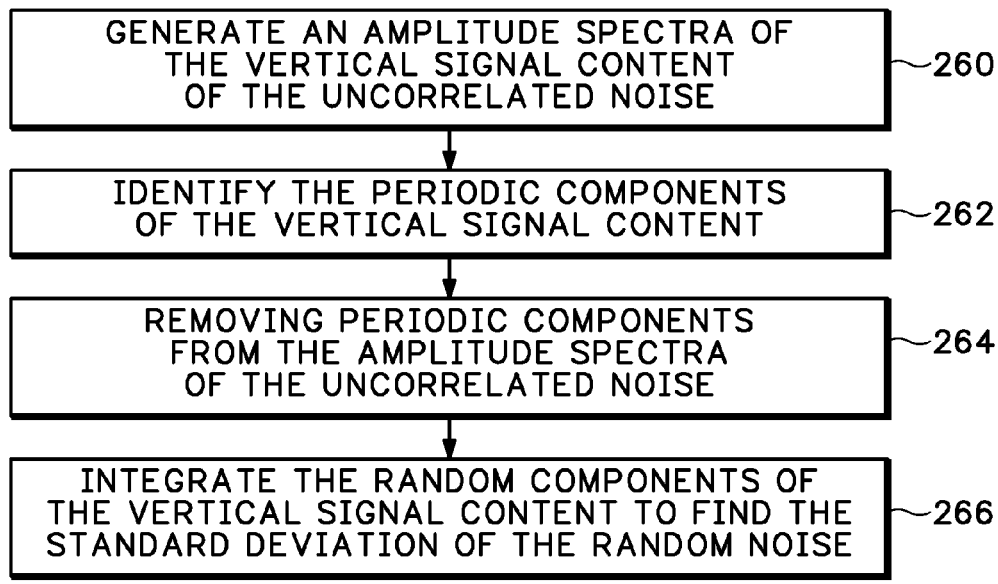
FIG. 7 is a flow chart representing the steps in determining the standard deviation of the random noise components of the amplitude spectra of the uncorrelated noise.

In the preferred embodiment, the oscilloscope acquires twenty-five 1000 sample waveform records at each of the defined location. The controller 16 signals the switch element to coupled the trigger signal from the trigger circuit to the gated oscillator 46. The controller 16 also signals the multiplexer 58 to coupled the gated oscillator 46 output to the strobe delay circuit 28. The gated oscillator 46 provides a clock signal to the strobe generator 60 for acquiring true sample time data records with low jitter. The horizontal span is set to the smallest time span of the oscilloscope and the twenty-five 1000 sample point records are acquired at the zero slope location. An FFT is applied to each 1000 point sample point record to generate an amplitude spectra of the vertical signal content of the uncorrelated noise in the waveform patten data as represented by step 260 in FIG. 7. The amplitude spectra of the twenty-five records includes both random noise $R_n$ and periodic noise $P_n$ components. Any periodic noise components $P_n$ are removed from the amplitude spectra as represented by steps 262 and 264. The periodic noise components appear as spikes or tones in the amplitude spectra. The resulting amplitude spectra of the twenty-five records is integrated to determine the standard deviation which is an estimate of the true vertical noise $R_n$ as represented by step 266.

Figure 8:
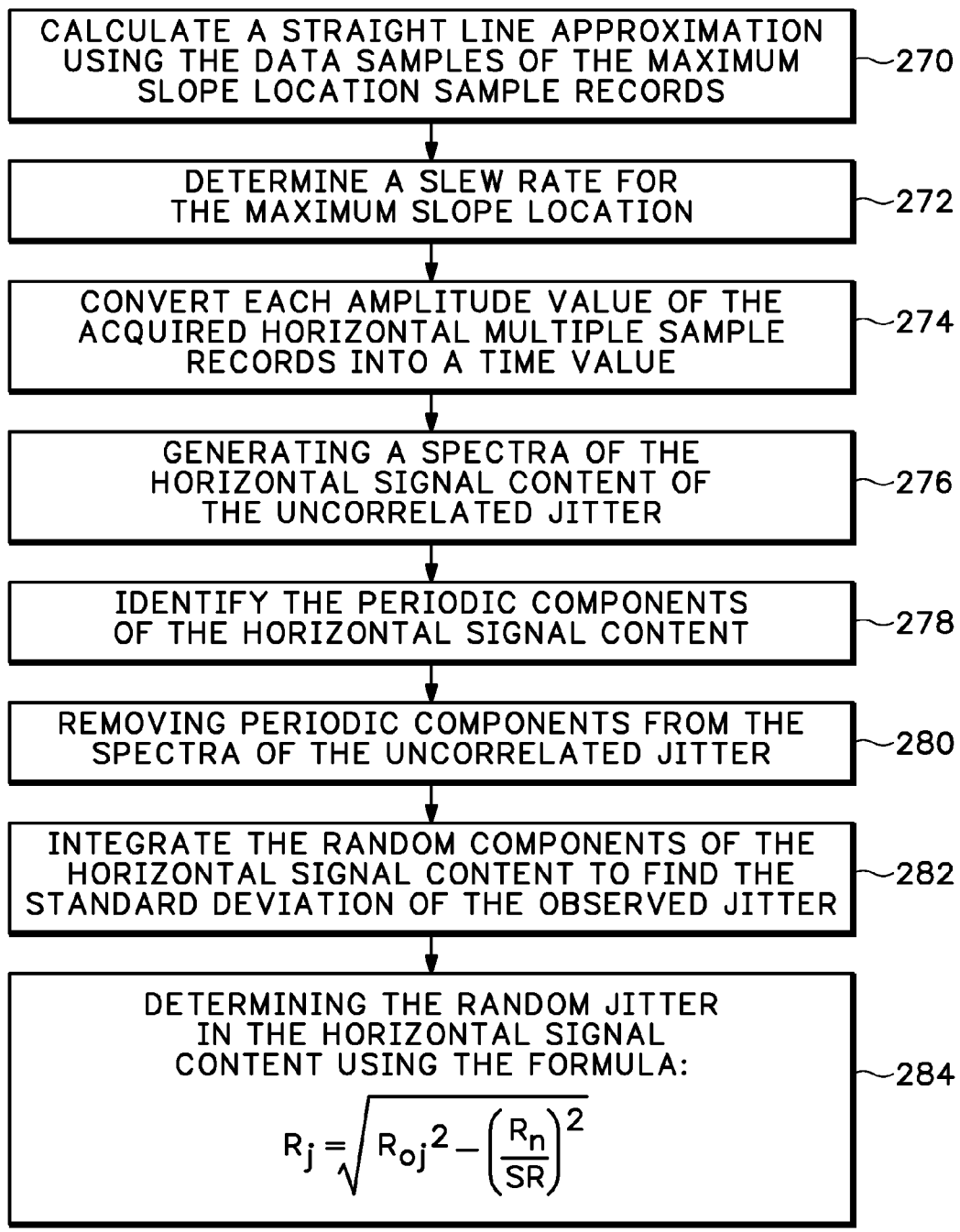
FIG. 8 is a flow chart representing the steps in generating in determining the standard deviation of the random jitter components in the horizontal spectra of the uncorrelated jitter.

The horizontal span is reset and the twenty-five 1000 sample point records are acquired at the sharpest rising edge location. In the preferred embodiment, the horizontal span is set to $\frac{1}{20}^{th}$ of the waveform pattern rise time. This relatively small time span is generally sufficient to satisfy the assumption of small signal linearity. That is, the time span is small relative to the signal transition time and so the signal will generally not contain significant curvature and can be modeled as a straight line. From the 25 k samples a straight line approximation is derived using a least-square-fit as represented in step 270 in FIG. 8. Using the straight line approximation, the slew rate SR (da/dt) of the sharpest rising edge location is determined as represented in step 272. The amplitude deviation (da) for each amplitude sample is determined as the difference between the straight line approximation and each amplitude sample. The ratio of the amplitude deviation (da) divided by the slew rate (da/dt) converts each amplitude deviation (da) into a timing deviation (dt). An FFT is applied to each 1000 point sample point record of the converted to timing deviations to generate a jitter spectra of the horizontal signal content of the uncorrelated jitter in the waveform patten data as represented by step 276. Any periodic jitter components $P_j$ are removed from the jitter spectra as represented by steps 278 and 280. The periodic jitter components appear as spikes or tones in the jitter spectra. The jitter spectra of the twenty-five records includes both observed random jitter $R_{oj}$ and periodic jitter $P_j$ components. The observed random jitter $R_{oj}$ contains both the true horizontal jitter components $R_j$ as well as vertical noise components translated through the slew rate (SR) into apparent jitter components. The jitter spectra of the twenty-five records is integrated to determine the standard deviation which is an estimate of the observed random jitter $R_{oj}$ as represented by step 282. The true horizontal jitter $R_j$ is extracted according to the following equation:

$$R_j = \sqrt{R_{oj}^2 - \left(\frac{R_n}{SR}\right)^2} \qquad \text{Eq. 1}$$

where $R_{oj}$ is the observed random jitter, $R_n$ is the random noise and SR is the slew rate of the straight line approximation as represented by step 284.

Figure 9A:
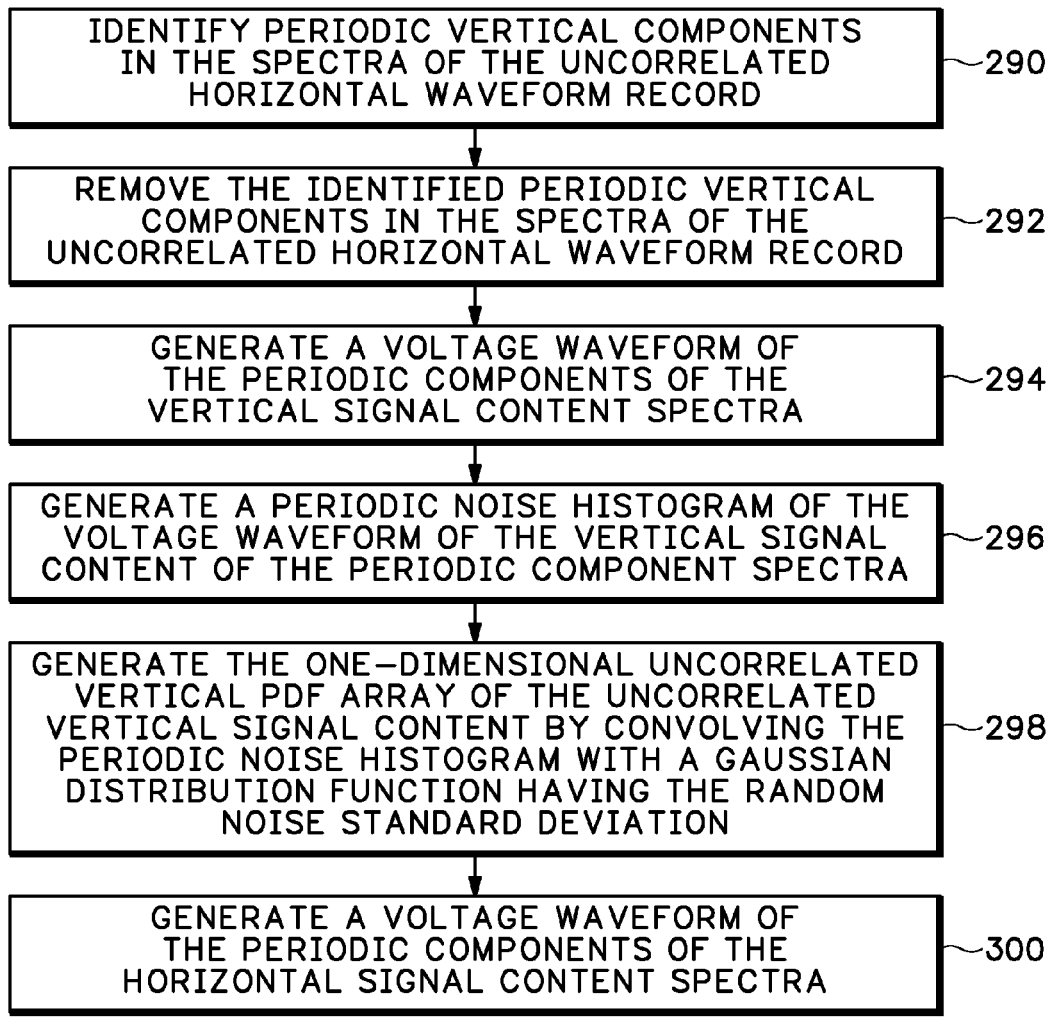
FIG. 9A and 9B are flow charts representing the steps in generating a two-dimensional PDF of the uncorrelated noise and jitter in the data pattern under test.
Figure 9B:
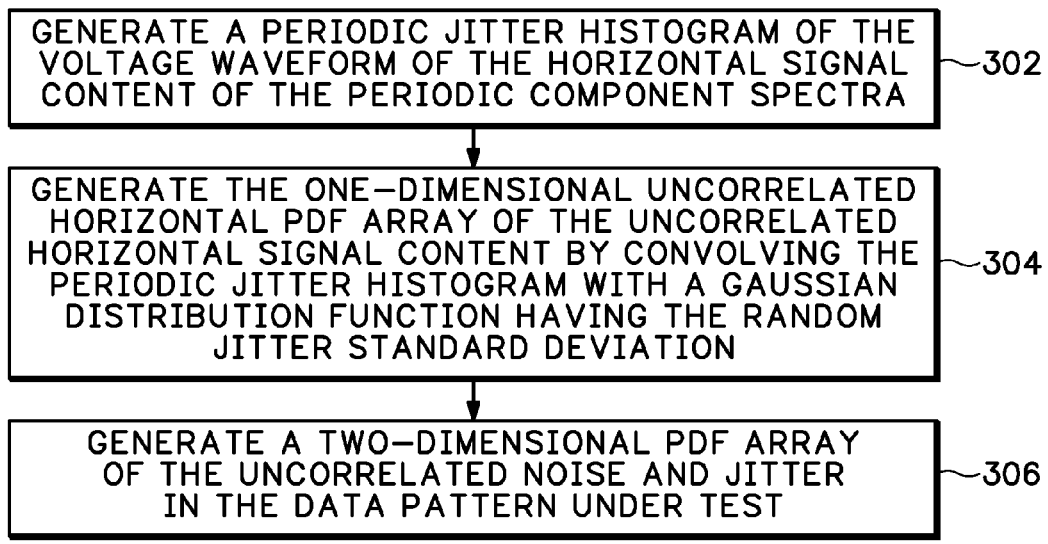
Figure 10:
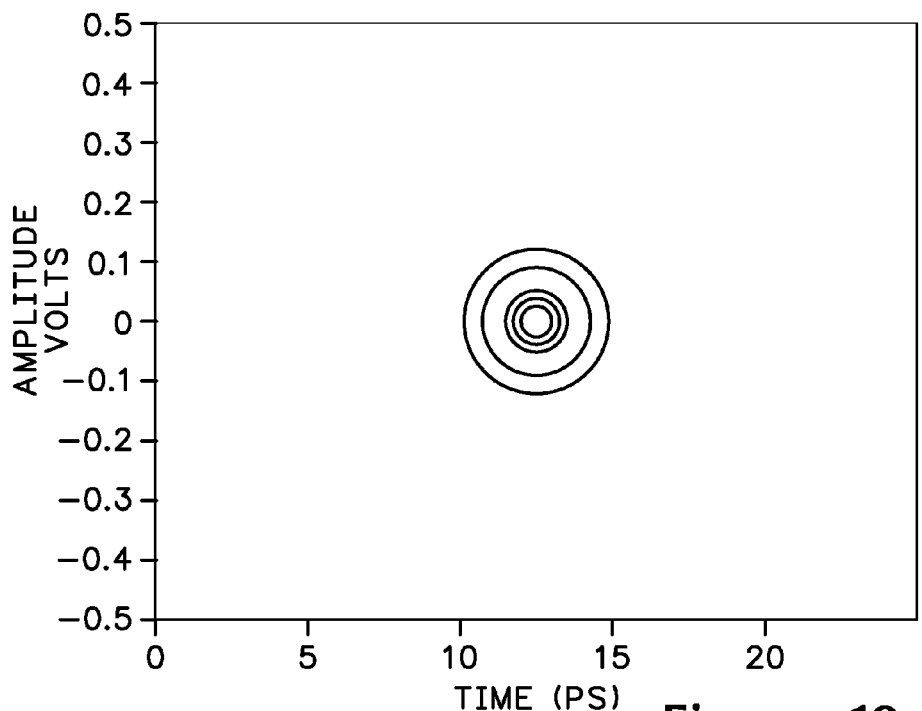
FIG. 10 is a visual representation of the two-dimensional PDF array of the uncorrelated noise and jitter in the data pattern under test.
Figure 11:
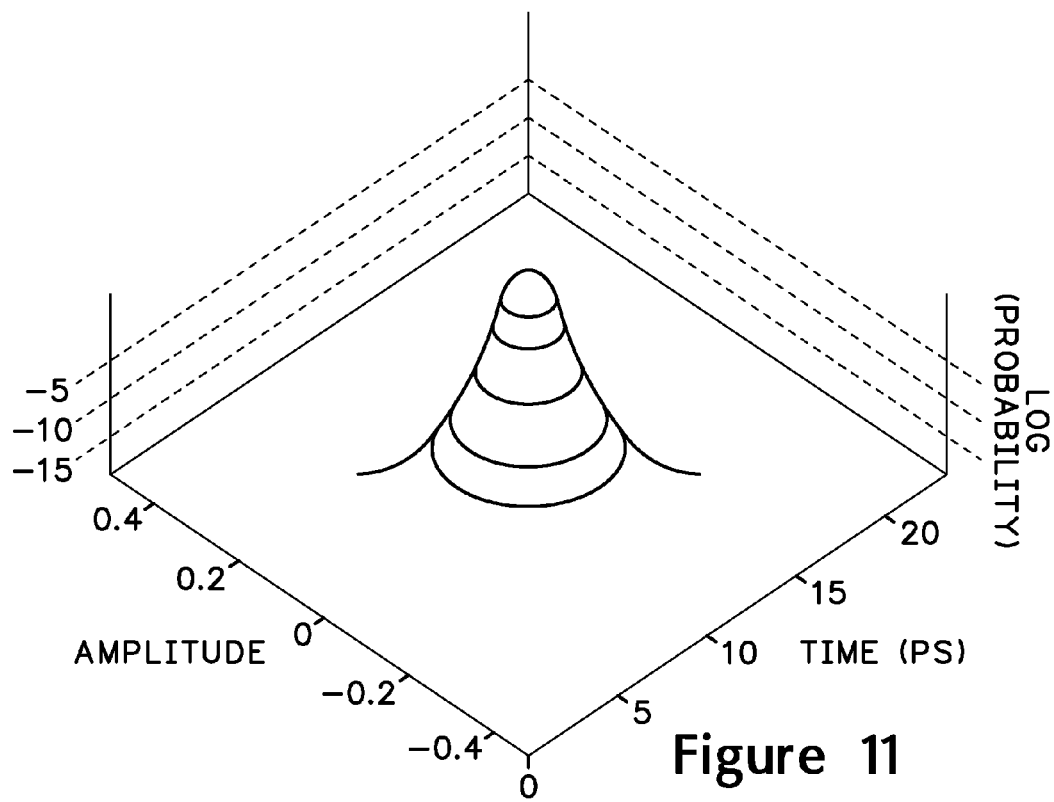
FIG. 11 is a three-dimensional visual representation of the two-dimensional PDF array of the uncorrelated noise and jitter in the data pattern under test.

The periodic components of the noise and jitter are reconciled frequency by frequency. If a periodic component is observed in the jitter spectra at a particular frequency but not in the noise spectra, it is considered a true periodic jitter $P_j$ component. If the periodic component is observed in both the jitter and noise spectra at a particular frequency, it is considered to be true periodic noise $P_n$ component and identified as such as represented by the step 290 in FIG. 9. The identified periodic noise components in the jitter spectra are removed as represented in step 292. An inverse FFT is applied to the periodic noise $P_n$ components and to the periodic jitter $P_j$ components to convert the respective periodic noise $P_n$ and jitter $P_j$ components into the time domain as represented by steps 294 and 300. A histogram is generated for each time domain representations of the periodic noise $P_n$ and periodic jitter $P_j$ components as represented in steps 296 and 302. The Gaussian distribution of the random noise $R_n$ is convolved with the histogram of the periodic noise $P_n$ to generate a one-dimensional uncorrelated noise (vertical) PDF array as represented in step 298. Likewise, the Gaussian distribution of the random jitter $R_j$ is convolved with the histogram of the periodic jitter $P_j$ to generate a one-dimensional uncorrelated jitter (horizontal) PDF array as represented in step 304. In the preferred embodiment, the one-dimensional arrays are 1×100. The one-dimensional uncorrelated noise (vertical) PDF array and the one-dimensional uncorrelated jitter (horizontal) PDF array are multiplied together to generate a 100× 100 two-dimensional PDF array for the uncorrelated content of the waveform pattern data describing the probability of sampling a particular point in both amplitude and time as represented by step 306. The floor of this uncorrelated content is the intrinsic horizontal jitter of the oscilloscope timebase and the vertical noise of the sampling module used. Since the processing of the waveform records subsequent to the acquisition of the data, these intrinsic error can potentially be de-embedded from the displayed results. FIGS. 10 and 11 are visual representations of the two-dimensional PDF array for the uncorrelated content of the waveform pattern data describing the probability of sampling a particular point in both amplitude and time. The concentric circles in the PDF array of FIG. 10 represent lines of equal probability in a log scale. FIG. 11 is a three dimensional representation of the two-dimensional PDF array of the uncorrelated content.

Figure 12:
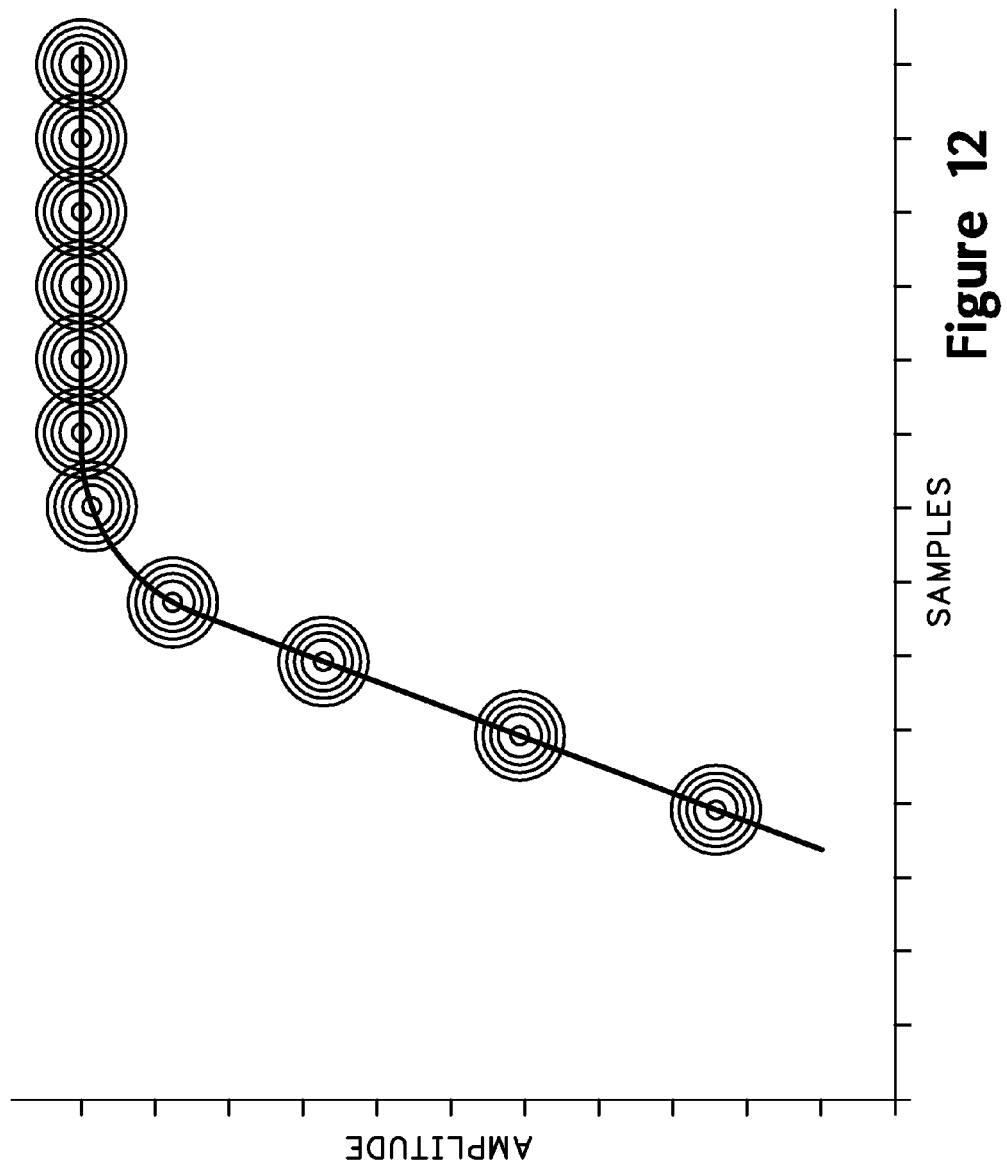
FIG. 12 is a visual representation of the convolving of the two-dimensional PDF array of the correlated waveform record data pattern with the two-dimensional PDF array of the uncorrelated noise and jitter in the data pattern under test.
Figure 13:
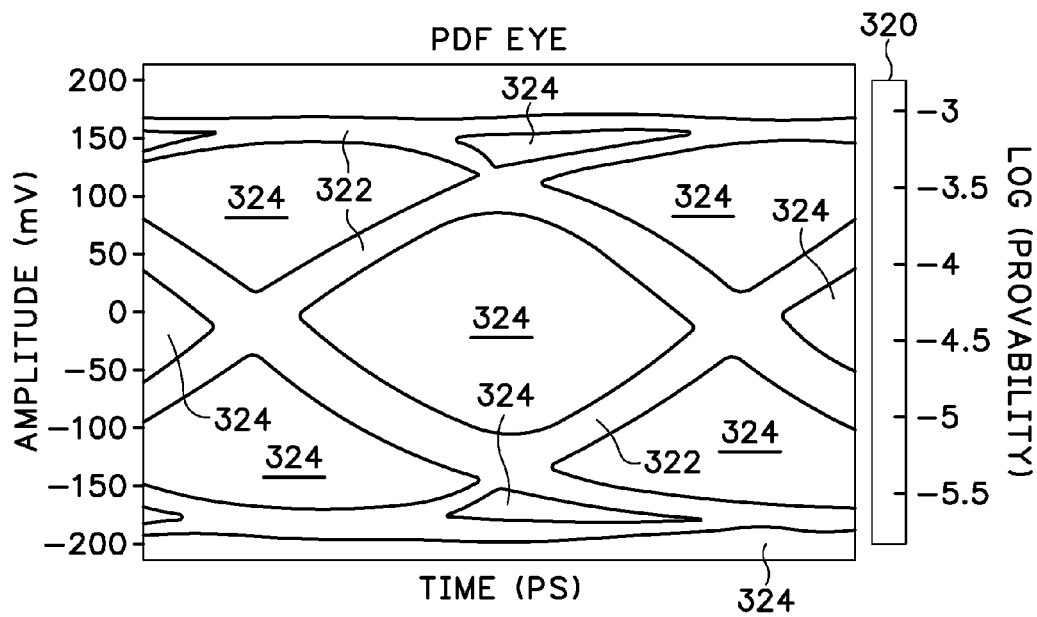
FIG. 13 is a display of a PDF eye diagram generated from the aggregate two-dimensional PDF eye diagram array.

To generate the two-dimensional probability density function eye diagram array, the two-dimensional correlated and uncorrelated PDF arrays are convolved together. FIG. 12 representatively shows this convolution where each location in the correlated PDF array of the waveform record of the data pattern is replaced with the two-dimensional PDF array of the uncorrelated noise and jitter of the data pattern under test. The resulting aggregate PDF array is divided into at least unit intervals (UI) of the data pattern and the convolved correlated and uncorrelated data of the unit interval are summed together. In the preferred embodiment of the invention, aggregate PDF array is divided into 1.5 unit interval segments positioned over each unit interval for purposes of displaying the PDF eye. The resulting PDF eye diagram array gives the probability of the bit pattern signal crossing into each element of aggregate PDF unit interval array. The PDF eye diagram array is displayed in color with the color grading from blue with a low probability to red for a higher probability as represented by the vertical bar 320 of the log of the probability as shown in FIG. 13. The data pattern 322 shows-up as red with the edges of the pattern grading to blue in areas 324.

Figure 14:
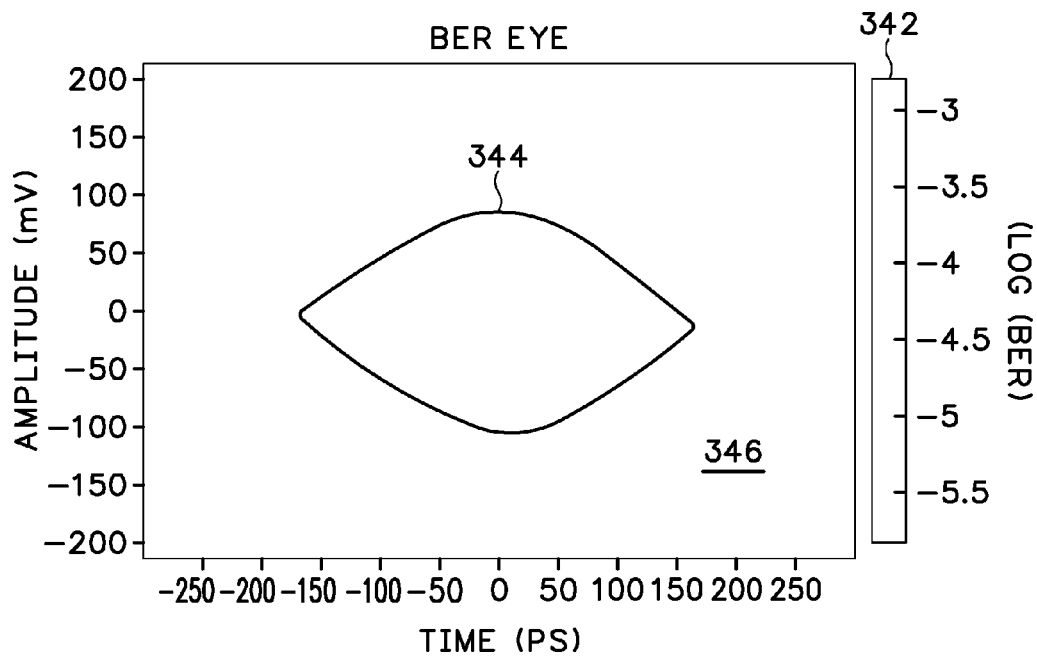
FIG. 14 is a display of a Bit Error Rate eye generated from the two-dimensional Bit Error Rate eye array according to the present invention.
Figure 15:
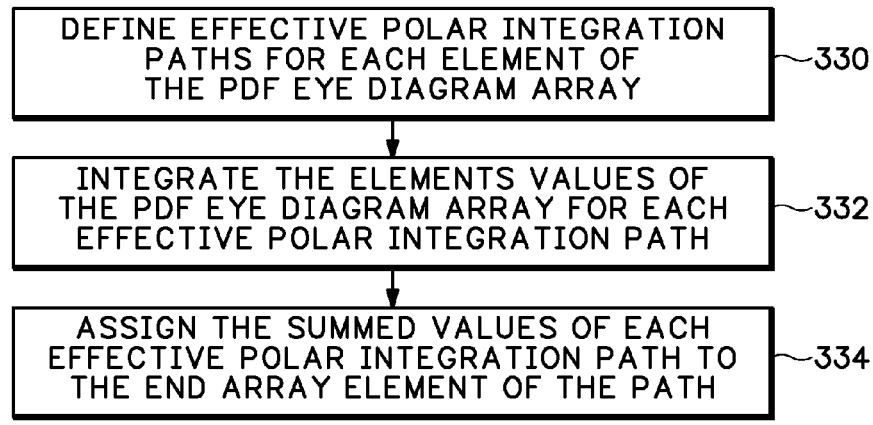
FIG. 15 is a flow chart representing the step in generating the Bit Error Rate eye according to the present invention.
Figure 16:
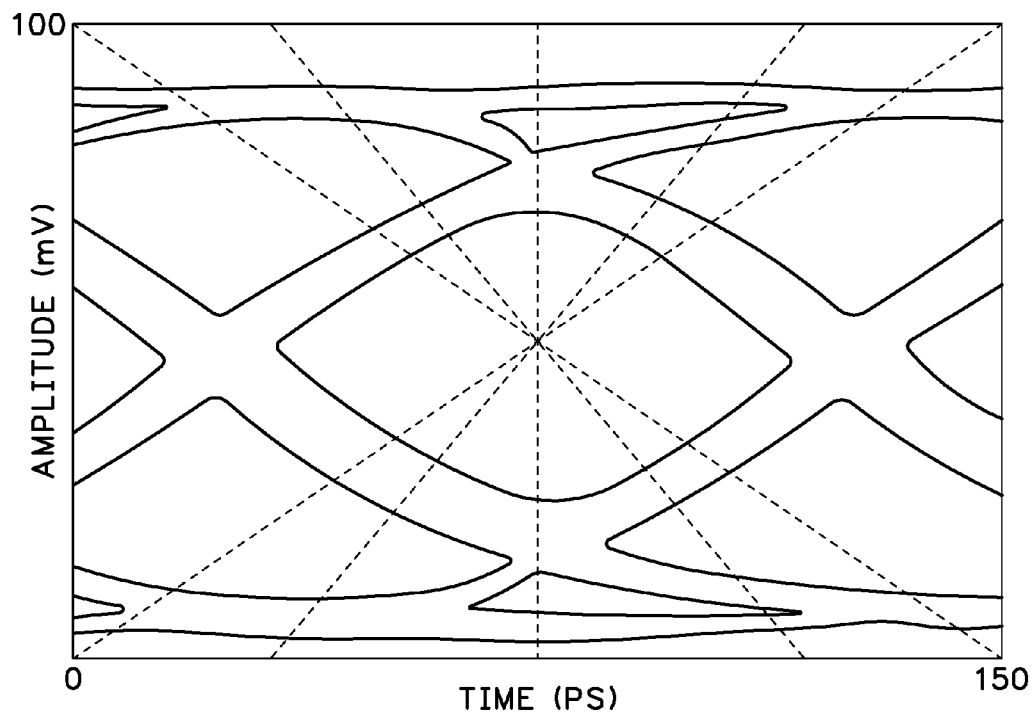
FIG. 16 is a visual representation of the effective polar integration paths associated with the two-dimensional PDF eye diagram array for generating the Bit Error Rate eye according to the present invention.

Referring to FIG. 14, there is shown a display of a Bit Error Rate eye generated from the two-dimensional probability density function eye diagram array. The two-dimensional Bit Error Rate eye visualization is similar to an "eye contour" or BERScan as well know in the field of Bit Error Rate testing. One method of generating the Bit Error Rate eye array is by radial integration of the two-dimensional probability density function eye diagram array. This may be accomplished by converting the PDF eye diagram array from a Cartesian coordinate system into a polar coordinate system, integrating, and then converting back to the Cartesian system. In the preferred embodiment of the invention, the PDF eye diagram array s maintained in the Cartesian coordinate system. An effective polar integration path is defined from the center element of the PDF eye diagram array to each element of the PDF eye diagram array as represented by step 330 in FIG. 15 and representatively shown by the dashed radial lines 340 in FIG. 16. The array values intersecting each of the polar integration paths are summed as represented by step 332 and assigned to that element in the array as represented by step 334. The resulting Bit Error Rate eye array is displayed in color with the color grading from blue with a low probability to red for a higher probability as represented by the vertical bar 342 of the log of the probability. The central region 344 will be displayed in blue with the surrounding region 346 displayed in red.

Figure 17A:
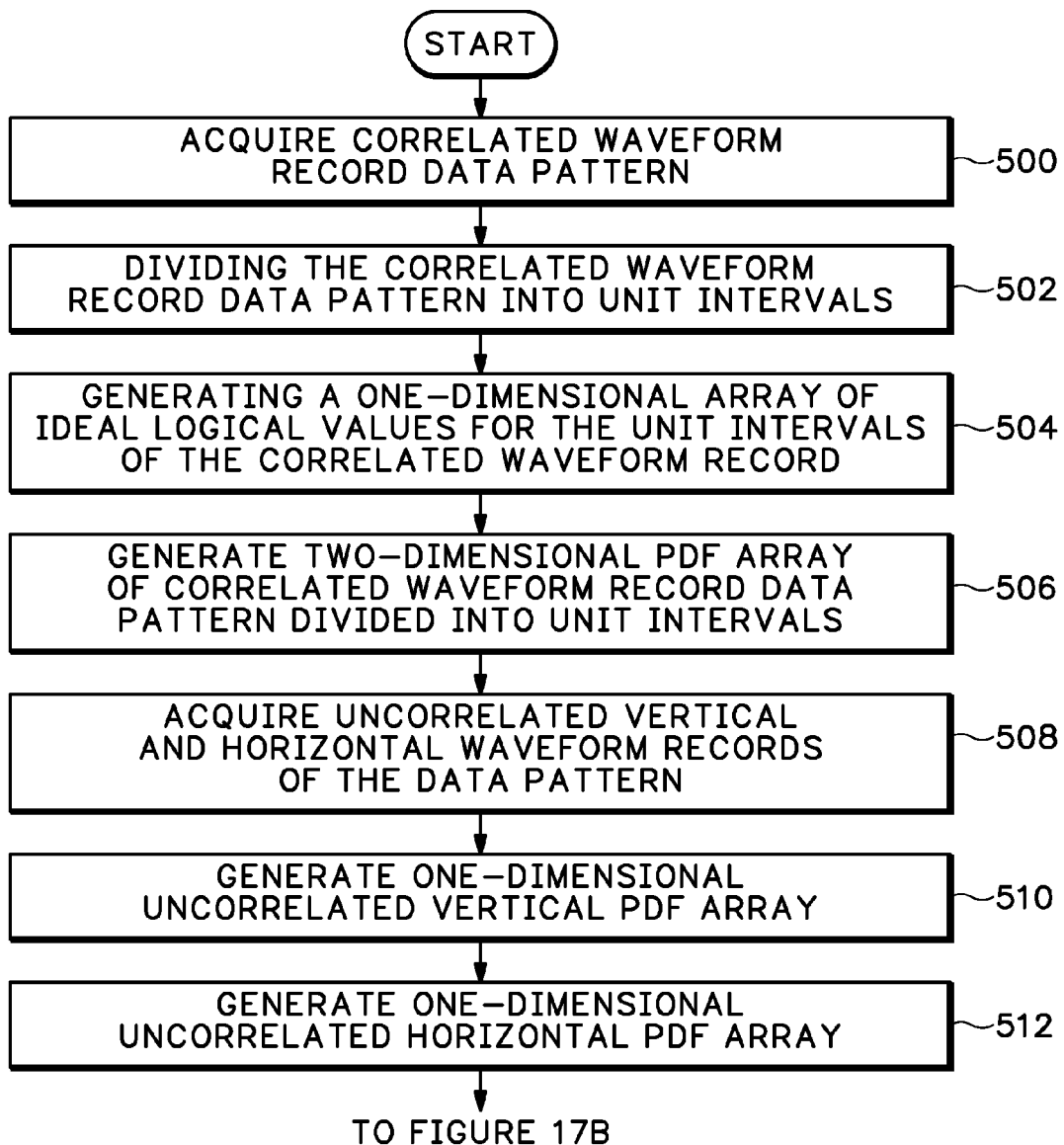
FIGS. 17A and 17B is a flow chart representing the steps in the preferred method of generating a two-dimensional PDF eye diagram array according to the present invention.
Figure 17B:
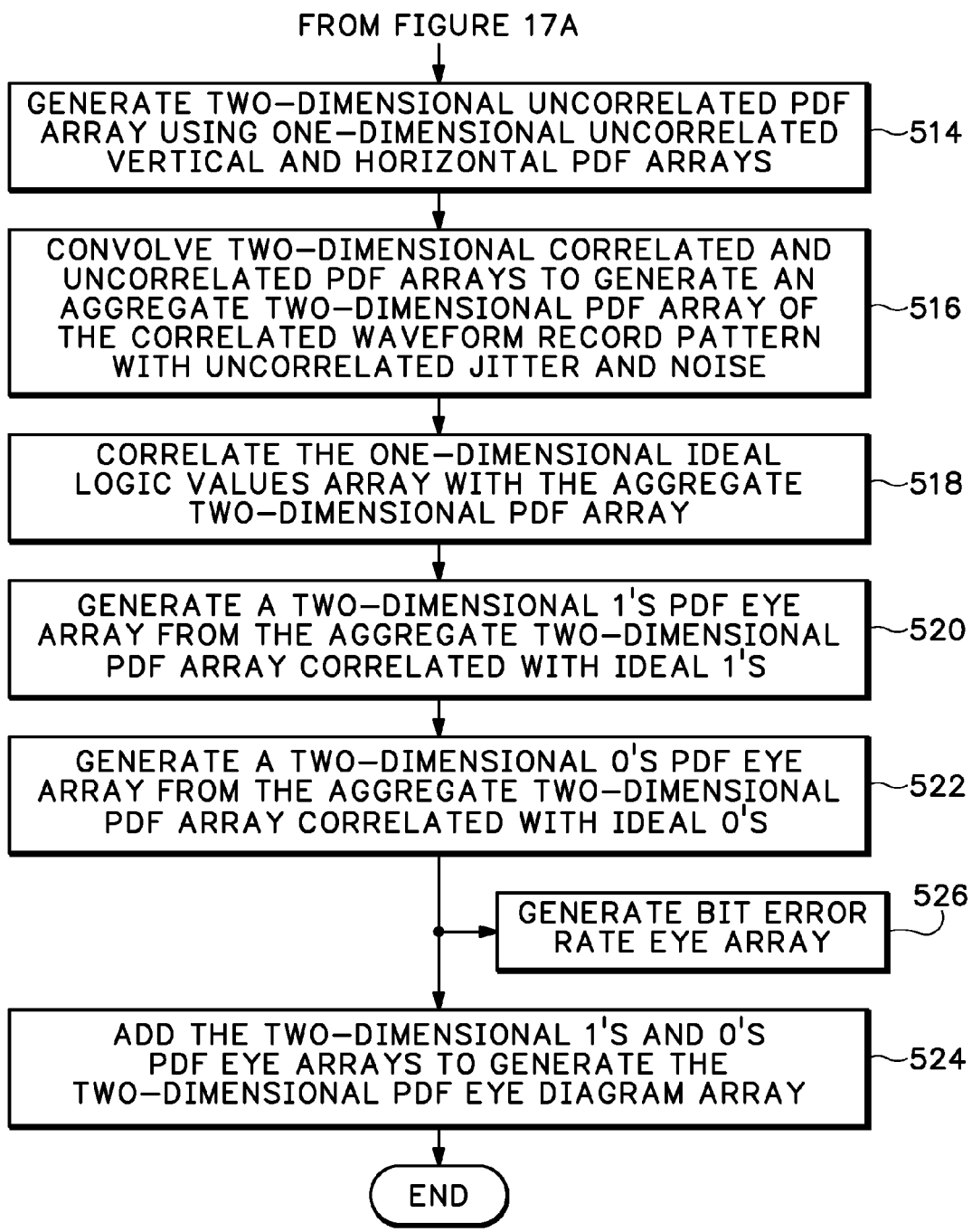

The preferred method of producing two-dimensional probability density function eye diagram and Bit Error Rate eye arrays is shown in the flow chart of FIG. 17. The preferred method performs many of the same steps as the previously described method and will not be described in detail below. This method starts with acquiring a correlated waveform record of the data pattern under test as represented by step 500. The correlated waveform record is divided into at least unit intervals as represented in step 502. As previously described, the display of the PDF eye diagram array covers 1.5 unit interval segments centered on the unit intervals. The correlated waveform record can be divided into the 1.5 unit interval segments without negating the underlying processes of generating the PDF eye diagram and the Bit Error Rate eye arrays. The below implementation will be described in relation to one unit interval segments but it is understood that longer segments centered on each unit interval may be used without departing from the scope of the invention.

Figure 18:
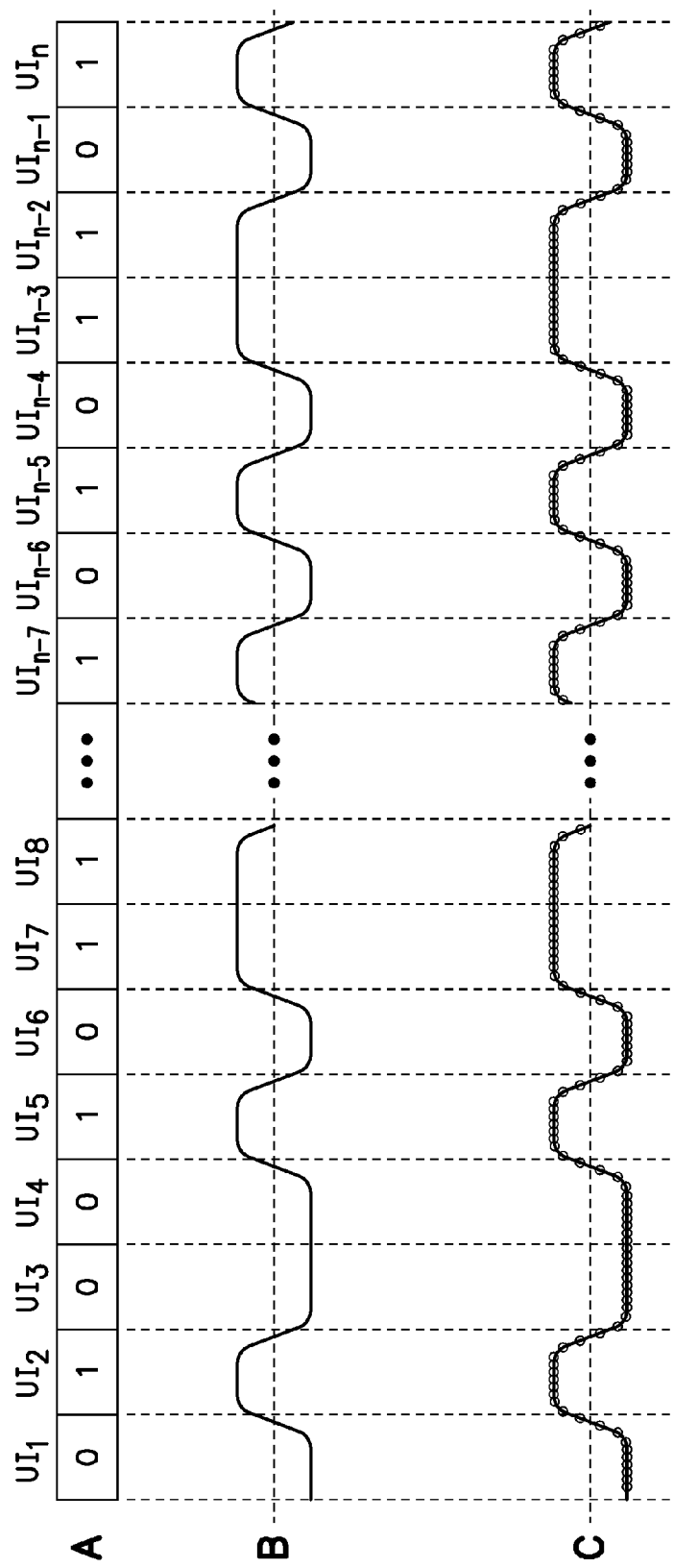
FIG. 18A is a representation of a one-dimensional array of logic levels of unit intervals in a correlated waveform record.
FIG. 18B is a representations of the correlated waveform record.
FIG. 18C is a representation of the aggregate two-dimensional PDF of the correlated waveform record with the uncorrelated noise and jitter.

A one-dimensional array is generated equal in length to the number of unit intervals in the correlated waveform record as representatively shown in FIG. 18A where "n" represents the total number of unit intervals in the correlated waveform record. The array elements are filled with zeros and ones based on the ideal logic level of the correlated waveform record of each unit interval as represented by step 504 and shown in FIG. 18B. One method of determining the logic level of the unit interval is to determine the mean of the correlated waveform record as a threshold level, select the acquired sample at the midpoint of the unit interval and compare the magnitude of the acquired sample to the threshold level. If the magnitude of the acquired sample is greater than the threshold level, the unit interval is considered a logic "1" otherwise the unit interval is considered a logic "0". The two-dimensional correlated PDF array of the correlated waveform data patten is generated and divided into unit intervals as represented in step 506. The uncorrelated vertical and horizontal waveform records are acquired at specific location in the correlated waveform record as represented in step 508. The random and periodic vertical signal content of the uncorrelated vertical waveform records is resolved and the one-dimensional uncorrelated vertical PDF array is generated representing the noise in the waveform record pattern as represented by step 510. Likewise, the random and periodic horizontal signal content of the uncorrelated horizontal waveform records are resolved and the one-dimensional uncorrelated horizontal PDF array is generated representing the jitter in the waveform record pattern as represented by step 512. The one-dimensional uncorrelated vertical and horizontal PDF arrays are multiplied together to generate the two-dimensional PDF array of the uncorrelated noise and jitter in the waveform pattern under test as represented by step 514. The two-dimensional PDF array of the correlated waveform record and the two-dimensional PDF array of the uncorrelated nosie and jitter are convolved to generate the aggregate two-dimensional PDF array of the correlated waveform record with the uncorrelated noise and jitter as represented in step 516 as representatively shown in FIG. 18C. To this point, the previously described method of generating the two-dimensional probability density function eye diagram array is the same as previously described with the exception of the added step of generating the one-dimensional array of ideal logical values of the correlated waveform record for the unit intervals of the correlated waveform record.

The one-dimensional array of ideal logic levels is correlated with the aggregate two-dimensional PDF array of the correlated waveform record with the uncorrelated noise and jitter as represented in step 518. The unit intervals of the aggregate two-dimensional PDF array that correspond to the unit intervals of one-dimensional array of ideal logic levels having a logic "1" are summed to generate a two-dimensional 1's PDF array as represented by step 520 and representatively shown in FIG. 19A (a 1.5 unit interval 1' eye diagram). As representatively shown in FIGS. 18A and 18C, $UI_2$, $UI_5$, $UI_7$, $UI_8$, $UI_{n-7}$, $UI_{n-5}$, $UI_{n-3}$, $UI_{n-2}$ and $UI_n$ are correlated with a logic "1" resulting in the corresponding UI's in the aggregate two-dimensional PDF array being summed together to generate the two-dimensional 1's PDF array shown in FIG. 19A. Likewise, the unit intervals of the aggregate two-dimensional PDF array that correspond to the unit intervals of one-dimensional array of ideal logic levels having a logic "0" are summed to generate a two-dimensional 0's PDF array as represented by step 522 and representatively shown in FIG. 19B (a 1.5 unit interval 0' eye diagram). The two-dimensional 1's and 0's PDF arrays are added together to generate the two-dimensional PDF eye diagram array as represented in step 524 and shown in FIG. 13.

Figure 20:
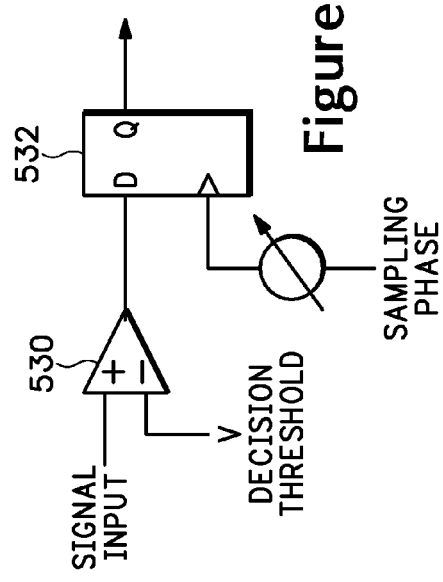
FIG. 20 is simplified hardware circuit for detecting the logic levels of the test signal in a Bit Error Rate Tester.

A Bit Error Rate eye array can be generated from the two-dimensional 1's and 0's PDF arrays as represented by step 526. The generation of a Bit Error Rate eye using a Bit Error Rate Tester (BERT) will be helpful in understanding the generation of the Bit Error Rate eye array using the two-dimensional 1's and 0's PDF arrays. FIG. 20 shows a simplified hardware circuit for detecting the logic levels of the test signal. The test signal is coupled to the plus input of a comparator 530 and a variable threshold signal is coupled to the minus input of the comparator 530. The output of the comparator 530 is coupled to the D input of flip-flop 530 that receives a variable clock signal at the latch input. The circuit compares the voltage of the test signal at various threshold levels and a various phases or time locations of the test signal.

As an example, FIG. 20 illustrates the beginning and end portions of the correlated waveform record of FIG. 18A as a test signal having an eight unit interval test pattern of 0,1,0, 0,1,0,11. The BERT is set-up to receive this pattern and compares the output of the detection circuit with known pattern. The dashed line 534 represents the threshold level for one comparison of the test signal at the various sampling phases. The "x" locations in each unit interval have the same sampling phase relative to the that unit interval. The output of the comparator 530 for locations marked as "x" on the threshold level 534 is logical 1,1,1,1,1,1,1,1 since the voltage level of the test signal is always above the threshold level. The output of the D flip-flop 532 is also be 1,1,1,1,1,1,1,1 at these locations. As compared to the ideal test pattern, there are four errors in the test pattern at this threshold level and at these locations in the unit intervals. The number of errors at this threshold level and at this sampling phase of the unit intervals is divided by the total number of unit intervals to calculate the Bit Error Rate for that threshold voltage and sampling phase of the unit intervals, which for this location is 0.5.

Figure 21:
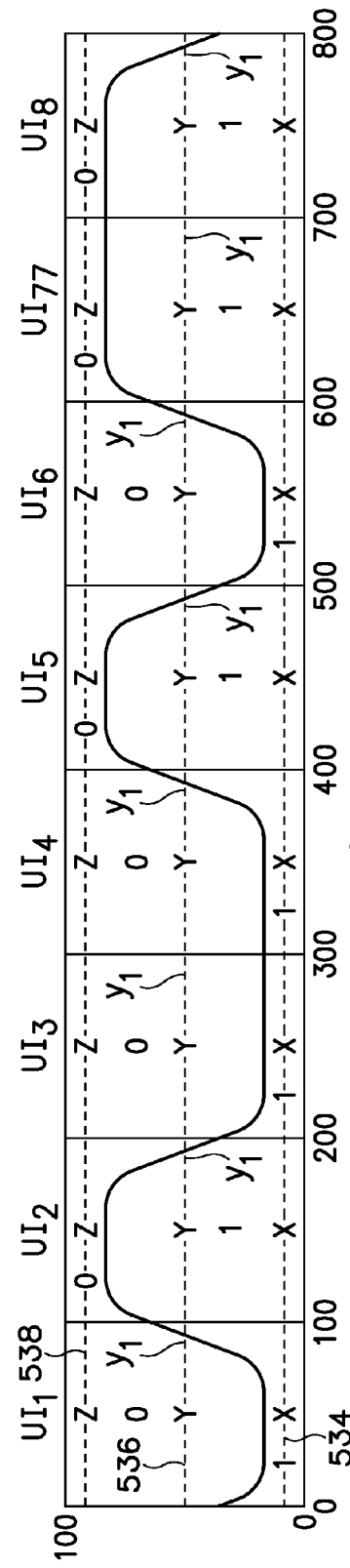
FIG. 21 is a representation of a portion of the correlated waveform data used as a test signal and the resulting detected output levels of the hardware detecting circuit.
Figure 22:
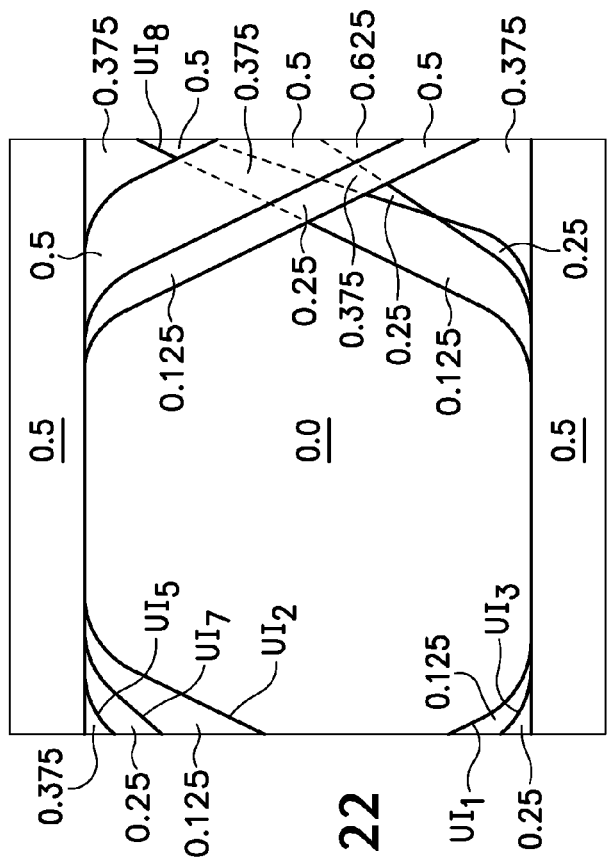
FIG. 22 is a probability function representing a Bit Error Rate eye.

The output of the comparator 530 for locations marked as "y" on the threshold level 536 is logical 0,1,0,0,1,0,1,1 since the voltage level of the test signal at unit intervals $UI_1$, $UI_3$, $UI_4$, and $UI_6$ are below the threshold and the voltage level of the test signal at unit intervals $UI_2$, $UI_5$, $UI_7$, and $UI_8$ are above the threshold level. The output of the D flip-flop 532 is also 0,1,0,0,1,0,1,1 at these locations. As compared to the ideal test pattern, there are no errors in the test pattern at this threshold level and at these locations in the unit intervals resulting in a Bit Error Rate of zero. The output of the comparator 530 for the locations marked "$y_1$" on the threshold level 536 is logical 0,0,0,0,0,1,1,1 as well as the output of the D flip-flop 532. The are three errors compared to the ideal test signal resulting in a Bit Error Rate of 0.375. The output of the comparator 530 for the locations marked "z" on the threshold level 538 is logical 0,0,0,0,0,0,0,0 since the voltage level of the test signal are below the threshold level. The output of the D flip-flop 532 is the same as the comparator logic levels. As compared to the ideal test pattern, there are four errors in the test pattern at this threshold level and at these locations in the unit intervals resulting in a Bit Error Rate of 0.5. The comparison of the test signal to the variable threshold levels at the various sampling phases for each of the unit intervals and the calculation of the Bit Error Rate for each threshold level and sampling phase location results in a Bit Error Rate eye as represented in FIG. 22. In summation, when the threshold level is below the voltage level of the test signal, the resulting logic level is "1" and when the threshold level is above the voltage level of the test signal, the resulting logic level is "0" as shown in FIG. 21.

Figure 23A:
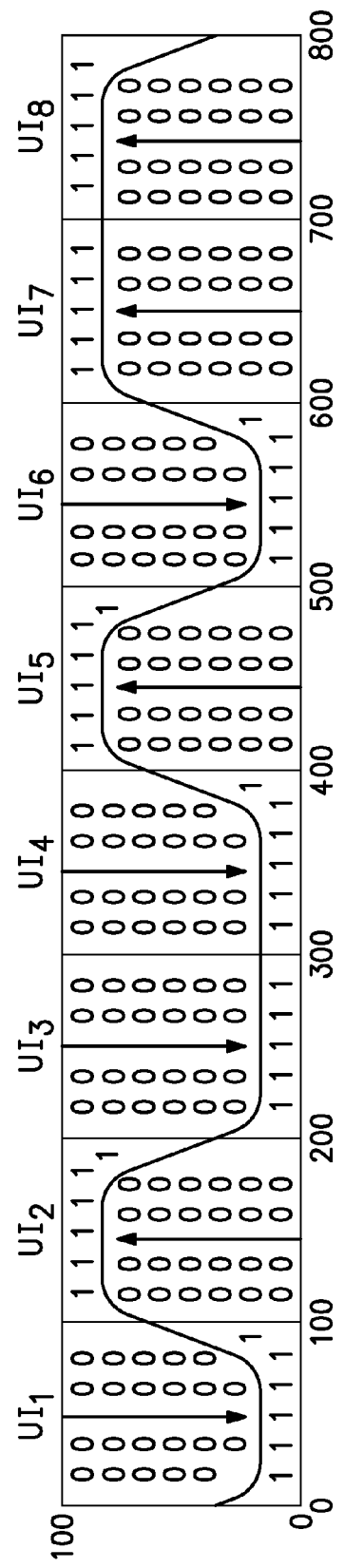
FIG. 23A is a presentation of a portion of the correlated waveform data that is vertically integrated upward and downward.

The preferred process for generating the Bit Error Rate eye array according to the present invention is best described in relation to the beginning and ending portions of correlated waveform record of FIG. 18B as reproduced in FIG. 23A. For purposes of explanation, the correlated waveform record is used with each signal trace within each unit interval being assigned a value of 1. The correlated waveform record has four unit intervals corresponding to an ideal logic level of "1" and four unit intervals corresponding to an ideal logic level of "0". One method of generating the Bit Error Rate eye array is to divided each unit interval into an array and to integrate the columns of each unit interval. The integration process includes performing an upward integration on each column in the unit interval arrays corresponding to an ideal logic level of "1", and to perform a downward integration on each column in the unit interval arrays corresponding to an ideal logic level of "0". The result is that for each unit interval corresponding to an ideal logic level of "1", the area below the trace has a zero value and the area above the trace has a one value. Conversely, for each unit interval corresponding to an ideal logic level of "0", the area above the trace has a value of zero and the area below the trace has a value of one. Relating the upward integration of the unit intervals corresponding to an ideal logic level of "1" to BERT detector, imagine that the threshold voltage and signal phase of the detector corresponds to an element in a column of the unit interval array, then the upward integration gives the probability of the signal being anywhere below that element in the column of the unit interval array, which would be measured as a error by the BERT. Likewise, the downward integration of the unit intervals corresponding to an ideal logic level of "0" gives the probability of the signal being anywhere above that element in the column of the unit interval array. The integrated unit interval arrays are added together and divided by the total number of unit intervals to generate a Bit Error Rate eye array.

Figure 23B:
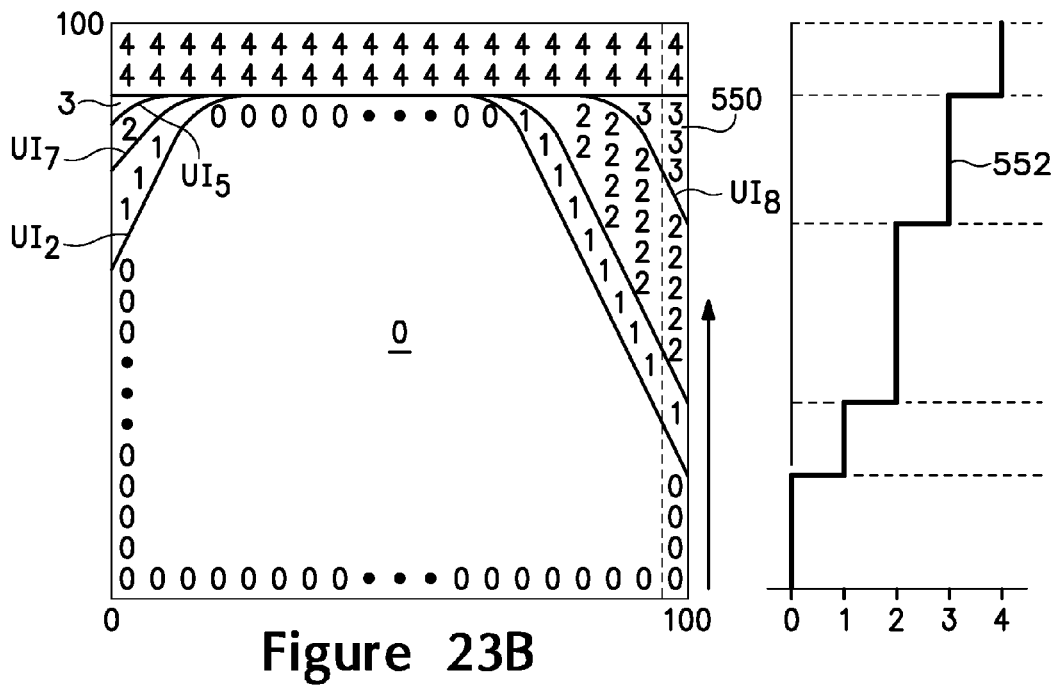
FIG. 23B is a representation of the upward integrated combined 1's unit intervals of the two-dimensional 1's PDF eye array.
Figure 23C:
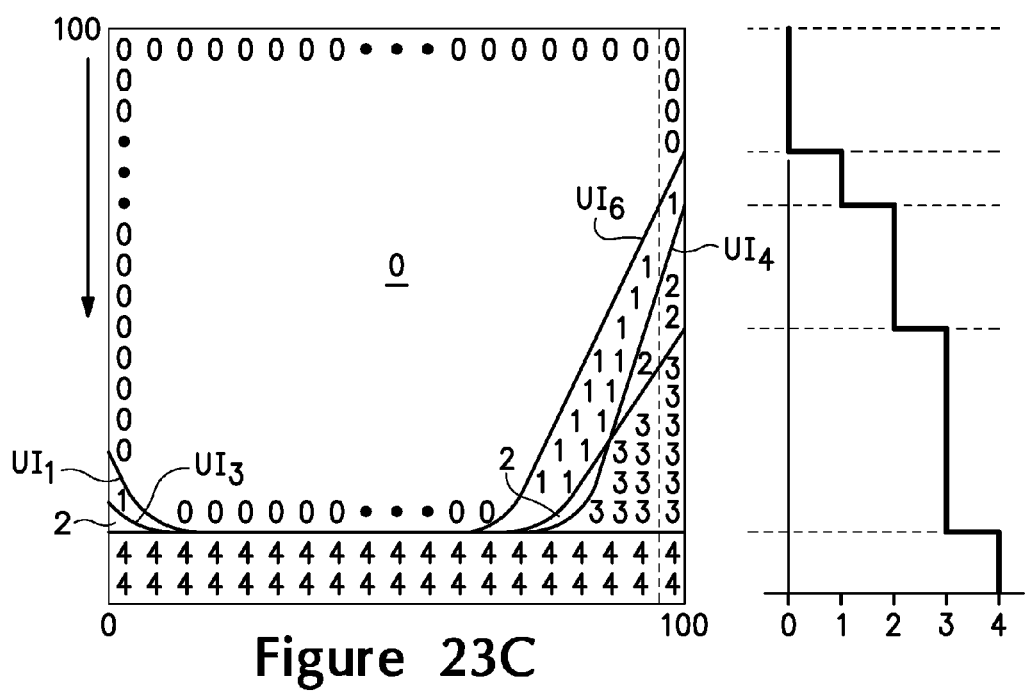
FIG. 23C is a representation of the downward integrated combined 0's unit intervals of the two-dimensional 0's PDF eye array.

The preferred method of generating the Bit Error Rate eye array is to combine the unit intervals corresponding to an ideal logic level of "1" to generate a two-dimensional 1's PDF eye array as represented in FIG. 23B consisting of four unit intervals and four traces. The unit intervals corresponding to an ideal logic level of "0" are combined to generate a two-dimensional 0's PDF eye array as represented in FIG. 23C consisting of four unit intervals and four traces. Keeping in mind that each unit interval is divided into 100 horizontal units and 100 vertical units, upward integrals are performed at each of the 100 horizontal locations on the two-dimensional combined 1's PDF eye array as represented by the column slice 550 in FIG. 23B. The integration waveform 552 for column slice 550 is shown to the right of FIG. 23B. The resulting 100×100 1's upward integration array is divided into regions with values ranging from 0 to 4 based on the number of traces encountered in the integration of each column slice. For the two-dimensional combined 0's PDF array, downward integrals are performed at each of the 100 horizontal locations as represented by the column slice 554 in FIG. 23C and the integration waveform for the column slice 554 to the right of FIG. 23C. The resulting 100×100 0' downward integration array is divided into regions with values ranging from 0 to four based on the number of traces encountered in the integration of each column slice.

Figure 23D:
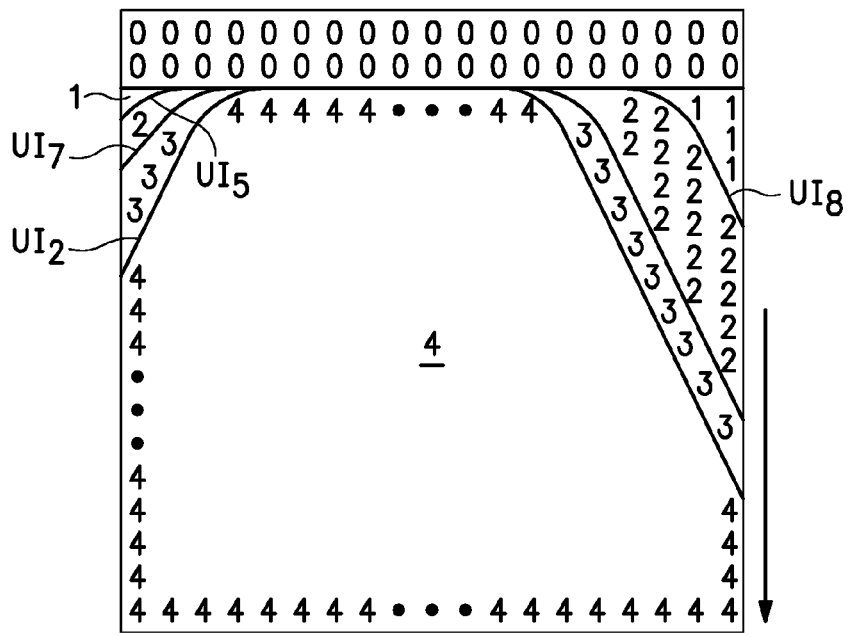
FIG. 23D is a representation of the downward integrated combined 1's unit intervals of the two-dimensional 1's PDF eye array.
Figure 23E:
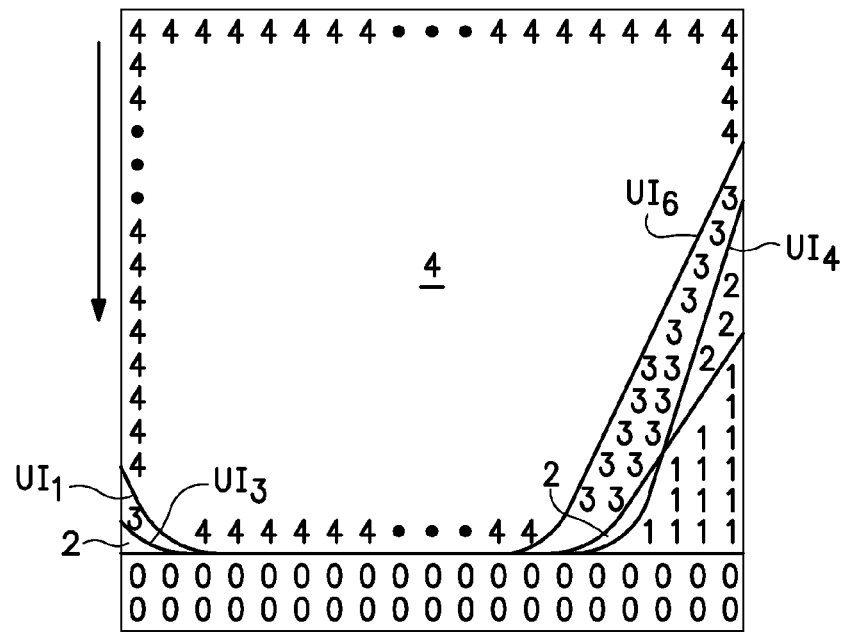
FIG. 23E is a representation of the upward integrated combined 0's unit intervals of the two-dimensional 0's PDF eye array.

FIG. 23D illustrate the 100×100 1's downward integration array of the two-dimensional combined 1's PDF eye array where downward integrals are performed at each of the 100 horizontal locations of the two-dimensional combined 1'PDF eye array. The values in the regions of the integration array are transposed in relation to the 1's upward integration array. That is the numbers 0, 1, 2, 3, 4 in the regions of the 1's upward integration array are 4, 3, 2, 1, 0 in the regions of the 1's downward integration array. FIG. 23E illustrate the 100× 100 0's upward integration array of the two-dimensional combined 0's PDF eye array where upward integrals are performed at each of the 100 horizontal locations of the two-dimensional combined 0's PDF eye array. As with the 1's downward integration array, the values in the regions of the 0's upward integration array are transposed in relation to the 0's downward integration array. That is the numbers 0, 1, 2, 3, 4 in the regions of the 0's downward integration array are 4, 3, 2, 1, 0 in the regions of the 0's upward integration array.

Figure 24A:
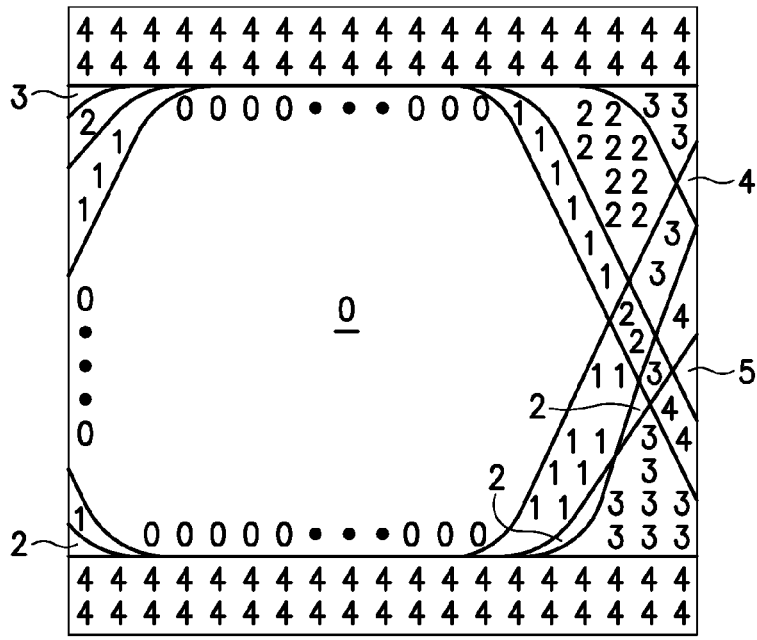
FIG. 24A is a presentation of the upward integrated combined 1's unit intervals of the two-dimensional 1's PDF eye array added to the downward integrated combined 0's unit intervals of the two-dimensional 0's PDF eye array.
Figure 24B:
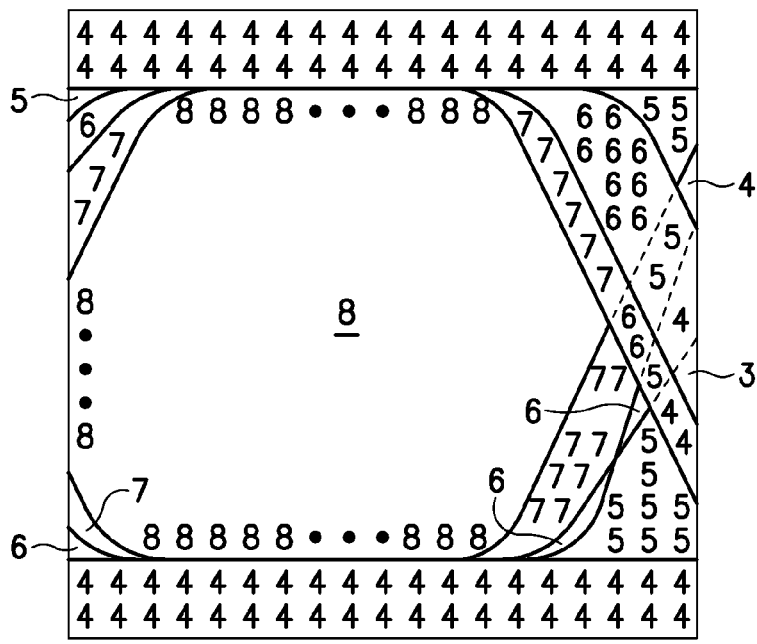
FIG. 24B is a presentation of the downward integrated combined 1's unit intervals of the two-dimensional 1's PDF eye array added to the upward integrated combined 0's unit intervals of the two-dimensional 0's PDF eye array.

The 1's upward integration array is added to the 0's downward integration array as shown in FIG. 24A. Likewise, the 1's downward integration array is added to the 0's upward integration array as shown in FIG. 24B. Adding together the 1's upward and downward integration arrays with the 0's downward and upward integration arrays produces an integration array where each value in the array is equal to the total number of 1's and 0's unit intervals, which in this example is eight. The summed 1's upward integration array and the 0's downward integration array is divided element by element by the summed 1's upward and downward integration arrays and the 0's downward and upward integration arrays to generate a Bit Error Rate eye array. Dividing the values in the regions of the 1's upward integration array added to the 0's downward integration array as shown in FIG. 24A by the number of unit intervals in the correlated waveform pattern produces the same results as is shown in the Bit Error Rate eye of FIG. 22.

Figure 19A:
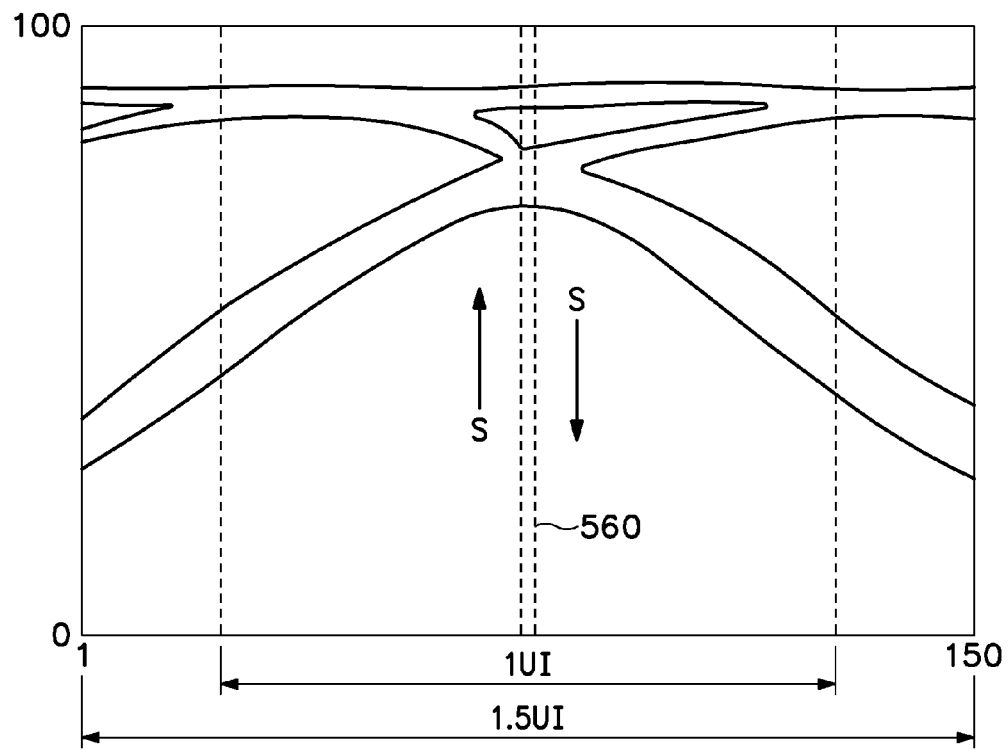
FIG. 19A is a representation of a two-dimensional 1's PDF eye array.
Figure 19B:
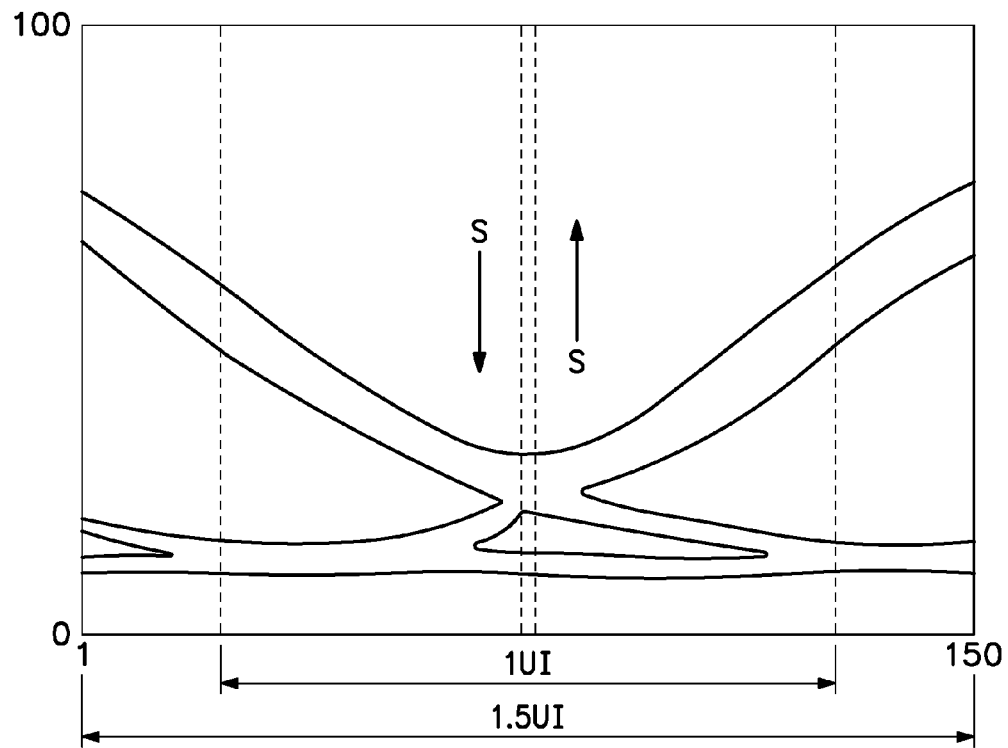
FIG. 19B is a representation of a two-dimensional 0's PDF eye array.
Figure 25:
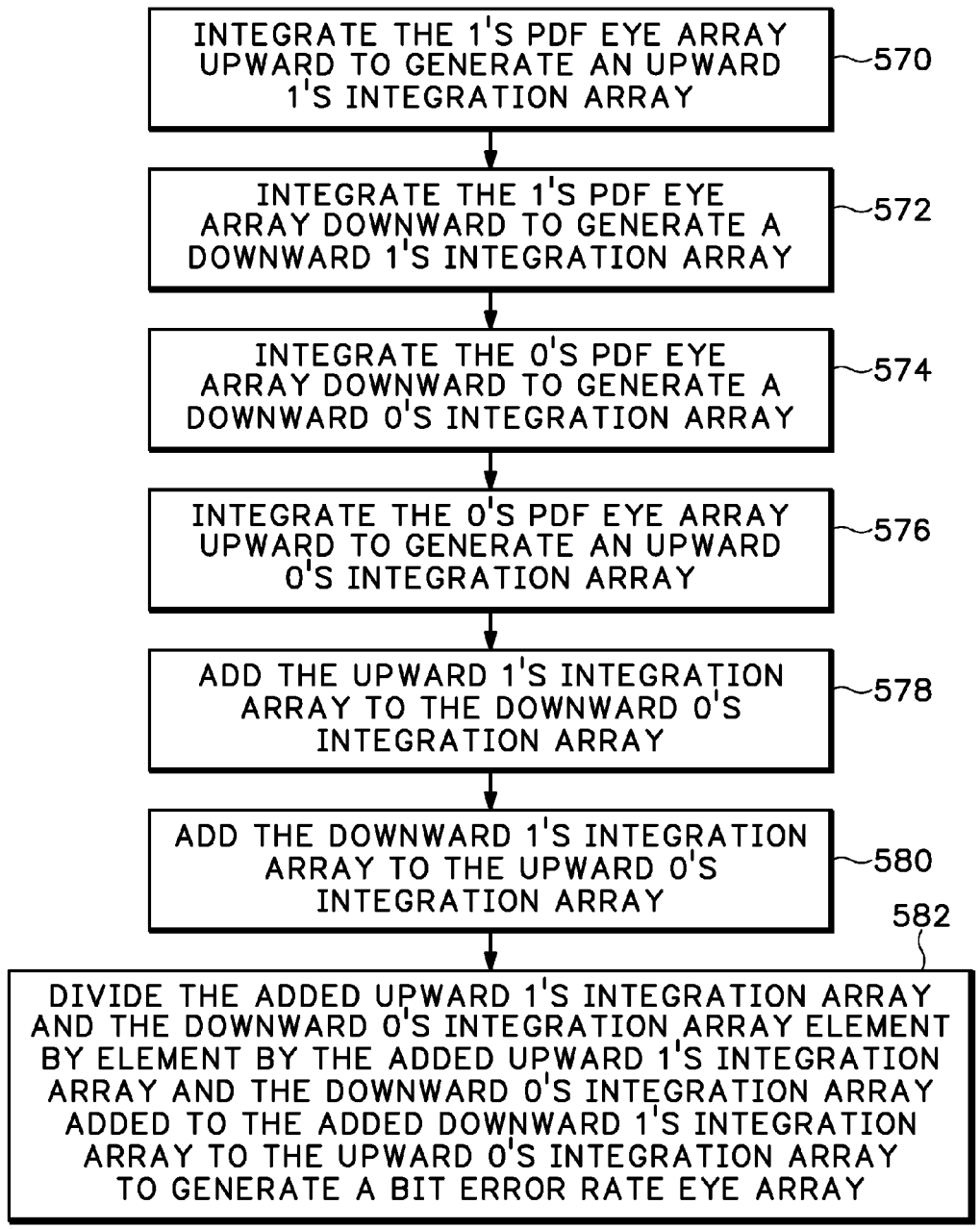
FIG. 25 is a flow chart representing the steps in generating the Bit Error Rate eye from the two-dimensional 1's PDF eye array and the two-dimensional 0's PDF eye array.

Referring to FIG. 25, there is shown a flow chart illustrating the steps in generating the Bit Error Rate eye array from the two-dimensional 1's PDF eye array and the two-dimensional 0's PDF eye array. The two-dimensional 1's PDF eye array and the two-dimensional 0's PDF eye diagram represent the statistical probability of data pattern having a particular magnitude and phase. Keeping in mind that two-dimensional 1's PDF eye array and the two-dimensional 0's PDF eye array are derived from the aggregate PDF array of the correlated waveform record with the uncorrelated noise and jitter that is preferably divided into 1.5 unit interval segments positioned over each unit interval for purposes of displaying the PDF eye, the two-dimensional 1's PDF eye array, as representatively shown in FIG. 19A, is integrated vertically upward at each of the horizontal array locations of the 1's PDF array as representatively shown by the array column 560 to generate an 1's upward integration array as represented by step 570. The two-dimensional 1's PDF eye array is also integrated vertically downward at each of the horizontal array locations of the 1's PDF eye array to generate a 1's downward integration array as represented in step 572. The two-dimensional 0's PDF eye array, as representatively shown in FIG. 19B, is integrated vertically downward at each of the horizontal array locations of the 0's PDF eye array as representatively shown by the array column 562 in FIG. 19B to generate a 0's downward integration array as represented by step 574. The two-dimensional 0's PDF eye array diagram is also integrated vertically upward at each of the horizontal array locations of the 0's PDF eye array to generate an 0's upward integration array as represented in step 576. The 1's upward integration array is added to the 0's downward integration array as represented by step 578. The resulting array represents the probability of the number errors in the data pattern and forms an eye. The 1's downward integration array is added to the 0's upward integration array as represented by step 580. The added 1's upward integration array and 0's downward integration arrays are added to the 1's downward integration array and the 0' upward integration arrays which represents the maximum statistical probability of the waveform pattern occurring an any point in the array. Each element of the added 1's upward integration array and 0's downward integration array is divided by the corresponding element of the added 1's upward integration array and 0's downward 0's integration arrays are added to the 1's downward integration array and the 0' upward integration arrays to generate a Bit Error Rate eye array as represented by step 582.

Figure 26A:
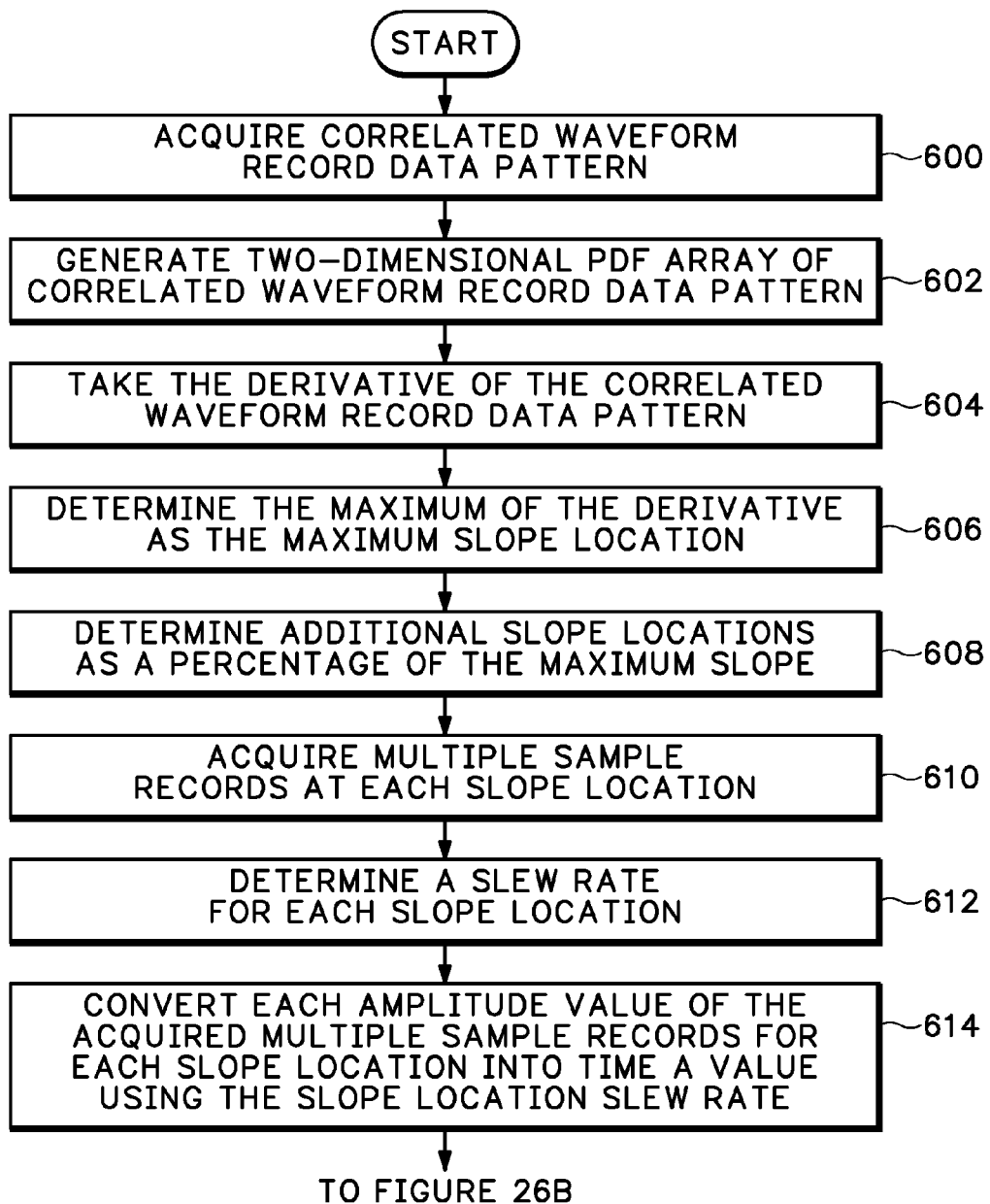
FIGS. 26A to 26C is a flow chart representing the steps in the alternative method of generating a two-dimensional PDF eye diagram array according to the present invention.
Figure 26B:
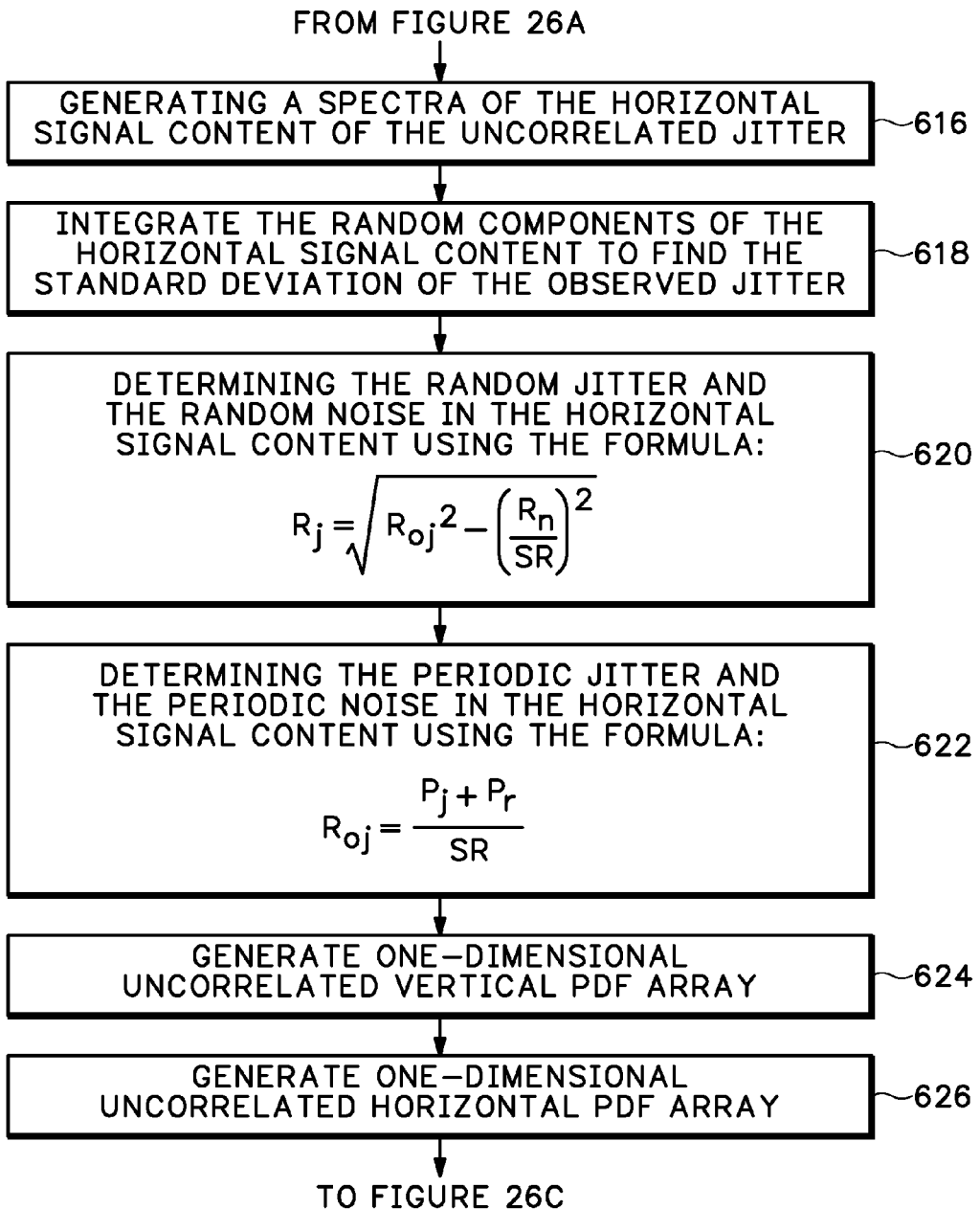
Figure 26C:
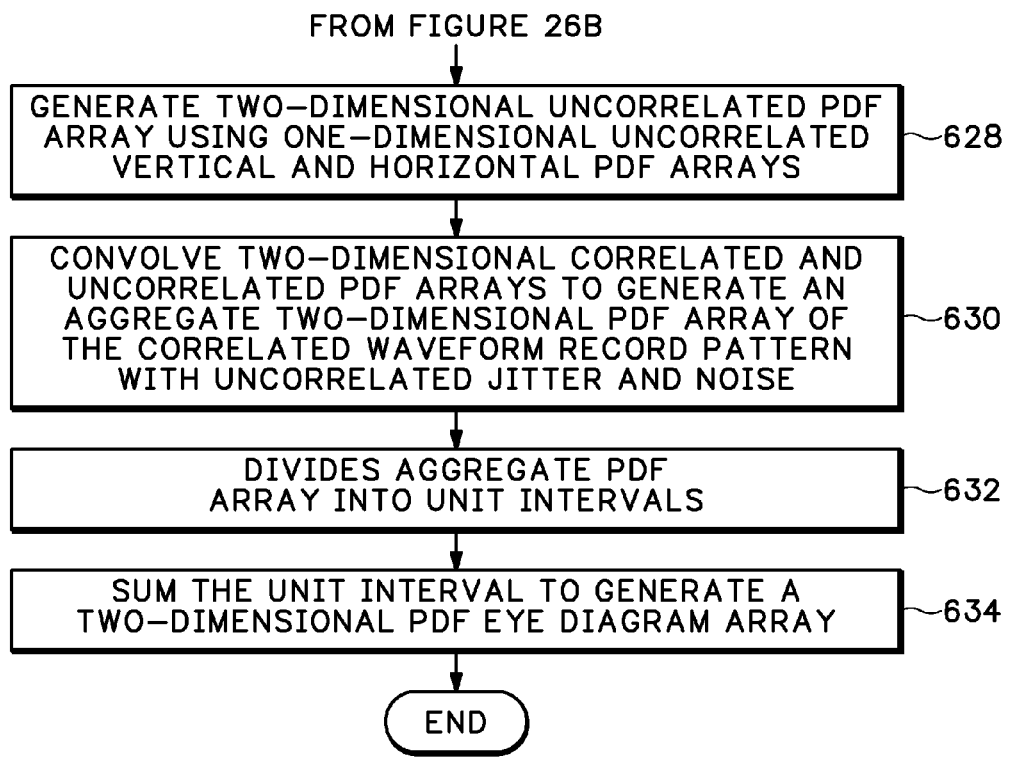

An alternative method of producing the two-dimensional PDF eye diagram array is to determine the horizontal and vertical uncertainties in the data pattern under test by analyzing the data pattern at different slew rates. This method starts with acquiring a correlated waveform record of the data pattern under test as represented by step 600 in FIG. 26. A two-dimensional PDF array is generated for the correlated waveform record as represented in step 602. The method of acquiring of the correlated waveform record and generating of the two-dimensional PDF array of the correlated waveform record is the same as previously described. The derivative of the correlated waveform record is taken to determine maximum slope location in the correlated waveform record as represented by step 604. The maximum of the derivative is taken as the maximum slope location as represented in step 606. Additional slope locations are determined from the derivative of the correlated waveform record as a percentage of the maximum slope as represented by step 608. In the preferred implementation, the additional slope locations are set as a percentage from 10 to 90 percent in 10 percent increments. Each of the slope locations is periodically sampled to acquire multiple sample records as represented by step 610. The slew rates for each of the slope locations are determined using the multiple sample records acquired at each slope locations as represented by step 612. Each of the amplitude values from the multiple sample records at each slope location are converted to time values as a function of the amplitude value divided by the slew rate for the particular slope location as represented by step 614. An FFT is performed on the converted time values at each slope location to generate spectra of the horizontal signal content of the uncorrelated horizontal waveform record of the data pattern under test at each slope location as represented by step 616. The spectra of the horizontal signal content at each slope location is integrated to generate a standard deviation of the observed random jitter $R_{oj}$ in the data pattern under test at each slope location as represented by step 618. The random jitter $R_j$ and the random noise $R_n$ is determined using the equation:

$$R_j = \sqrt{R_{oj}^2 - \left(\frac{R_n}{SR}\right)^2}$$

and solving simultaneous equations for the random jitter $R_j$ and the random noise $R_n$ as represented by step 620. The random jitter and the random noise are the standard deviation of a Gaussian distribution function. The periodic noise $P_n$ and the periodic jitter $P_j$ is determined using the equation:

$$R_{oj} = \frac{P_n + P_j}{SR}$$

and solving simultaneous equations for the periodic noise $P_n$ and the periodic jitter $P_j$ as represented by step 622. A one-dimensional uncorrelated vertical probability density function array is generated from the calculated random and periodic noise as represented by step 624. A one-dimensional uncorrelated horizontal probability density function array is generated from the calculated random and periodic jitter as represented by step 626. The one-dimensional uncorrelated vertical and horizontal probability density function arrays are multiplied to generate a two-dimensional probability density function of the uncorrelated jitter and noise in the data pattern under test as represented by step 628. The PDF array of the correlated waveform record data pattern is convolved with the two-dimensional probability density function array of the uncorrelated jitter and noise to generate an aggregate two-dimensional probability density function array having statistically correct jitter and noise in the correlated waveform record data pattern as represented by step 630. The aggregate probability density function array is divided into the unit intervals (UI) of the data pattern as represented by step 632 and the convolved correlated and uncorrelated data of the unit interval are summed together to generate the two-dimensional probability density function eye diagram array as represented by step 634.

A method has been described for producing a PDF eye diagram array and a Bit Error Rate eye array using a digital sampling oscilloscope. This method of producing a PDF eye diagram array and a Bit Error Rate eye array may equally be implemented on a real-time digital oscilloscope or other types of digitizing instruments that can acquire waveform records of a data pattern under test to generate a correlated PDF array of the waveform record data pattern and an uncorrelated PDF array of the noise and jitter in the data pattern under test.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method of producing a two-dimensional probability density function eye diagram array, for use in a test and measurement instrument comprising the steps of:
   a) acquiring a correlated waveform record of a data pattern under test containing data samples having horizontal locations and associated vertical amplitudes, said correlated waveform record being acquired via an acquisition portion of said test and measurement instrument;
   b) calculating a probability density function integration value for the correlated waveform record data pattern;
   c) dividing the correlated waveform record data pattern into unit intervals;
   d) defining a common array for each unit interval;
   e) locating each data sample of the correlated waveform record data pattern within the unit interval arrays; and
   f) entering the probability density function integration value at each data sample location in the unit interval arrays,
   g) generating a two-dimensional probability density function array of the correlated waveform record data pattern;
   h) acquiring an uncorrelated vertical and horizontal waveform records of the data pattern under test at respective zero slope and maximum slope locations in the correlated waveform record data pattern;
   i) generating a one-dimensional uncorrelated vertical probability density function array of uncorrelated vertical signal content in the uncorrelated vertical waveform record representing the noise in the data pattern under test;
   j) generating a one-dimensional uncorrelated horizontal probability density function array of uncorrelated horizontal signal content in the uncorrelated horizontal waveform record representing the jitter in the data pattern under test;
   k) multiplying the one-dimensional uncorrelated horizontal probability density function array by the one-dimensional uncorrelated vertical probability density function array to generate a two-dimensional probability density function array of the uncorrelated jitter and noise in the data pattern under test;
   l) convolving the two-dimensional probability density function array of the correlated waveform record data pattern with the two-dimensional probability density function array of the uncorrelated jitter and noise in the data pattern under test to generate an aggregate two-dimensional probability density function array of the correlated waveform record pattern with uncorrelated jitter and noise; and m) dividing the aggregate two-dimensional probability density function array of the correlated waveform record pattern with uncorrelated jitter and noise into unit intervals and summing the unit intervals of the aggregate two-dimensional probability density function array of the correlated waveform record pattern with uncorrelated jitter and noise to generate a two-dimensional probability density function eye diagram array.

2. The method of producing a two-dimensional probability density function eye diagram array as recited in claim 1 wherein the acquiring of the uncorrelated vertical and horizontal waveform records step further comprises the steps of:

a) determining the zero slope location in the correlated waveform record data pattern as the minimum of the derivative of the correlated waveform record data pattern;

b) determining the maximum slope location in the correlated waveform record data pattern as the maximum of the derivative of the correlated waveform record data pattern;

c) periodically sampling the zero slope location in the correlated waveform record data pattern to acquiring multiple sample records for the uncorrelated vertical waveform record of the data pattern under test; and d) periodically sampling the maximum slope location in the correlated waveform record data pattern to acquiring multiple sample records for the uncorrelated horizontal waveform record of the data pattern under test.

3. The method of producing a two-dimensional probability density function eye diagram array as recited in claim 2 wherein the generating of a one-dimensional uncorrelated vertical probability density function array step further comprises the steps of:

a) generating a spectra of the vertical signal content in the uncorrelated vertical waveform record of the data pattern under test by performing a Fast Fourier Transform on each acquired multiple sample record wherein the spectra contains random and periodic components of the uncorrelated vertical waveform record of the data pattern under test; and b) integrating the vertical signal content spectra containing the random components of the uncorrelated vertical waveform record of the data pattern under test to determine a standard deviation of the random components representing the random noise in the in the data pattern under test.

4. The method of producing a two-dimensional probability density function eye diagram array as recited in claim 3 wherein the integrating of the vertical signal content spectra containing the random components of the uncorrelated vertical waveform record of the data pattern under test further comprises the steps of:

a) identifying the vertical signal content of the periodic components in the spectra of the uncorrelated vertical waveform record of the data pattern under test; and b) removing the vertical signal content of the periodic components in the spectra of the uncorrelated vertical waveform record of the data pattern under test.

5. The method of producing a two-dimensional probability density function eye diagram array as recited in claim 3 wherein the generating of a one-dimensional uncorrelated horizontal probability density function array step further comprises the steps of:

a) determining a slew rate for the maximum slope location in the correlated waveform record data pattern;

b) converting each amplitude value of the acquired multiple sample records for the uncorrelated horizontal waveform record of the data pattern under test into a time value as a function of the amplitude value divided by the slew rate;

c) generating a spectra of the horizontal signal content of the uncorrelated horizontal waveform record of the data pattern under test by performing a Fast Fourier Transform on the converted time values of each acquired multiple sample record wherein the spectra contains random and periodic components of the uncorrelated horizontal waveform record of the data pattern under test;

d) integrating the horizontal signal content spectra containing the random components of the uncorrelated horizontal waveform record of the data pattern under test to determine a standard deviation of the random components representing the observed random jitter in the in the data pattern under test;

e) determining random jitter in the in the data pattern under test as a function of the observed random jitter, the random noise and the slew rate of the maximum slope location in the correlated waveform record data pattern using the formula:

$$R_j = \sqrt{(R_{oj}^2) - \left(\frac{R_n}{SR}\right)^2}.$$

6. The method of producing a two-dimensional probability density function eye diagram array as recited in claim 5 wherein the determining of a slew rate for the maximum slope location in the correlated waveform record data pattern step further comprises the step of calculating a straight line through the acquired multiple record samples for the uncorrelated horizontal waveform record of the data pattern under test.

7. The method of producing a two-dimensional probability density function eye diagram array as recited in claim 5 wherein the integrating of the horizontal signal content spectra containing the random components of the uncorrelated horizontal waveform record of the data pattern under test further comprises the steps of:

a) identifying the horizontal signal content of the periodic components in the spectra of the uncorrelated horizontal waveform record of the data pattern under test; and b) removing the horizontal signal content of the periodic components in the spectra of the uncorrelated horizontal waveform record of the data pattern under test.

8. The method of producing a two-dimensional probability density function eye diagram array as recited in claim 5 further comprising the steps of:

a) comparing the periodic components in the spectra of the uncorrelated horizontal waveform record to the periodic components in the spectra of the uncorrelated vertical waveform record to identify periodic vertical components in the spectra of the uncorrelated horizontal waveform record;

b) removing the identified periodic vertical components in the spectra of the uncorrelated horizontal waveform record from the spectra of the uncorrelated horizontal waveform record;

c) generating an amplitude voltage waveform of the vertical signal content spectra containing the periodic components of the uncorrelated vertical waveform record of the data pattern under test by performing an Inverse Fast Fourier Transform on the vertical signal content of the periodic component spectra;

d) generating a histogram of the amplitude voltage waveform of the vertical signal content of the periodic component spectra representing the periodic noise in the data pattern under test;

e) convolving a Gaussian distribution function having the calculated standard deviation of the random noise and the histogram of the periodic noise to generate the one-dimensional uncorrelated vertical probability density function array of the uncorrelated vertical signal content in the uncorrelated vertical waveform record representing the noise in the data pattern under test;

f) generating an amplitude voltage waveform of the horizontal signal content spectra containing the periodic components of the uncorrelated horizontal waveform record of the data pattern under test by performing an Inverse Fast Fourier Transform on the horizontal signal content of the periodic component spectra;

g) generating a histogram of the amplitude voltage waveform of the horizontal signal content of the periodic component spectra representing the periodic jitter in the data pattern under test; and h) convolving a Gaussian distribution function having the calculated standard deviation of the random jitter and the histogram of the periodic jitter to generate the one-dimensional uncorrelated horizontal probability density function array of the uncorrelated horizontal waveform record representing the jitter in the data pattern under test.

9. The method of producing a two-dimensional probability density function eye diagram array as recited in claim 1 further comprising the steps of:

a) defining a center coordinate in the two-dimensional probability density function eye diagram array;

b) defining integrations paths between the center coordinate and each element of the two-dimensional probability density function eye diagram array;

c) summing the element values of the two-dimensional probability function eye diagram array intersecting each of the defined integration paths;

d) assigning the summed element value for each of the defined integration paths to the respective element of the two-dimensional probability density function eye diagram defining the integration path from the center coordinate; and e) generating a Bit Error Rate eye array from the summed element values.

10. A method of producing a two-dimensional probability density function eye diagram array for use in a test and measurement instrument, comprising the steps of:

a) acquiring a correlated waveform record of a data pattern under test, said correlated waveform being acquired by an acquisition portion of said test and measurement instrument;

b) dividing the correlated waveform record data pattern into unit intervals;

c) generating a one-dimensional array of ideal 1's and 0's logical values for the unit intervals of the correlated waveform record;

d) generating a two-dimensional probability density function array of the correlated waveform record data pattern divided into unit intervals;

e) acquiring an uncorrelated vertical and horizontal waveform records of the data pattern under test at respective zero slope and maximum slope locations in the correlated waveform record data pattern;

f) generating a one-dimensional uncorrelated vertical probability density function array of uncorrelated vertical signal content in the uncorrelated vertical waveform record representing the noise in the data pattern under test;

g) generating a one-dimensional uncorrelated horizontal probability density function array of uncorrelated horizontal signal content in the uncorrelated horizontal waveform record representing the jitter in the data pattern under test;

h) multiplying the one-dimensional uncorrelated horizontal probability density function array by the one-dimensional uncorrelated vertical probability density function array to generate a two-dimensional probability density function array of the uncorrelated jitter and noise in the data pattern under test;

i) convolving the two-dimensional probability density function array of the correlated waveform record data pattern with the two-dimensional probability density function array of the uncorrelated jitter and noise in the data pattern under test to generate an aggregate two-dimensional probability density function array of the correlated waveform record pattern with uncorrelated jitter and noise;

j) correlating the one-dimensional array of ideal 1's and 0's logical values for the unit intervals of the correlated waveform record with the unit intervals of the aggregate two-dimensional probability density function array of the correlated waveform record pattern with uncorrelated jitter and noise;

k) summing the unit intervals of the aggregate two-dimensional probability density function array of the correlated waveform record pattern with uncorrelated jitter and noise correlated with the ideal 1's logic values to generate a two-dimensional 1's probability density function eye array;

l) summing the unit intervals of the aggregate two-dimensional probability density function array of the correlated waveform record pattern with uncorrelated jitter and noise correlated with the ideal 0's logic values to generate a two-dimensional 0's probability density function eye array; and m) adding the two-dimensional 1's probability density function eye array with the two-dimensional 0's probability density function eye array to generate a two-dimensional probability density function eye diagram array.

11. The method of producing a two-dimensional probability density function eye diagram array as recited in claim 10 wherein the correlated waveform record data pattern contains data samples having horizontal locations and associated vertical amplitudes and the generating of the two-dimensional probability density function of the correlated waveform record data pattern step further comprises the steps of:

a) calculate a probability density function integration value for the correlated waveform record data pattern;

b) define a common array for each unit interval of the correlated waveform record data pattern;

c) locate each data sample of the correlated waveform record data pattern within the unit interval arrays; and d) enter the probability density function integration value at each data sample location in the unit interval arrays.

12. The method of producing a two-dimensional probability density function eye diagram array as recited in claim 10 wherein the acquiring of the uncorrelated vertical and horizontal waveform records step further comprises the steps of:
  a) determining the zero slope location in the correlated waveform record data pattern as the minimum of the derivative of the correlated waveform record data pattern;
  b) determining the maximum slope location in the correlated waveform record data pattern as the maximum of the derivative of the correlated waveform record data pattern;
  c) periodically sampling the zero slope location in the correlated waveform record data pattern to acquiring multiple sample records for the uncorrelated vertical waveform record of the data pattern under test; and
  d) periodically sampling the maximum slope location in the correlated waveform record data pattern to acquiring multiple sample records for the uncorrelated horizontal waveform record of the data pattern under test.

13. The method of producing a two-dimensional probability density function eye diagram array as recited in claim 12 wherein the generating of a one-dimensional uncorrelated vertical probability density function array step further comprises the steps of:
  a) generating a spectra of the vertical signal content in the uncorrelated vertical waveform record of the data pattern under test by performing a Fast Fourier Transform on each acquired multiple sample record wherein the spectra contains random and periodic components of the uncorrelated vertical waveform record of the data pattern under test; and
  b) integrating the vertical signal content spectra containing the random components of the uncorrelated vertical waveform record of the data pattern under test to determine a standard deviation of the random components representing the random noise in the in the data pattern under test.

14. The method of producing a two-dimensional probability density function eye diagram array as recited in claim 13 wherein the integrating of the vertical signal content spectra containing the random components of the uncorrelated vertical waveform record of the data pattern under test further comprises the steps of:
  a) identifying the vertical signal content of the periodic components in the spectra of the uncorrelated vertical waveform record of the data pattern under test; and
  b) removing the vertical signal content of the periodic components in the spectra of the uncorrelated vertical waveform record of the data pattern under test.

15. The method of producing a two-dimensional probability density function eye diagram array as recited in claim 13 wherein the generating of a one-dimensional uncorrelated horizontal probability density function array step further comprises the steps of:
  a) determining a slew rate for the maximum slope location in the correlated waveform record data pattern;
  b) converting each amplitude value of the acquired multiple sample records for the uncorrelated horizontal waveform record of the data pattern under test into a time value as a function of the amplitude value divided by the slew rate;
  c) generating a spectra of the horizontal signal content of the uncorrelated horizontal waveform record of the data pattern under test by performing a Fast Fourier Transform on the converted time values of each acquired multiple sample record wherein the spectra contains random and periodic components of the uncorrelated horizontal waveform record of the data pattern under test;
  d) integrating the horizontal signal content spectra containing the random components of the uncorrelated horizontal waveform record of the data pattern under test to determine a standard deviation of the random components representing the observed random jitter in the in the data pattern under test;
  e) determining random jitter in the in the data pattern under test as a function of the observed random jitter, the random noise and the slew rate of the maximum slope location in the correlated waveform record data pattern using the formula:

$$R_j = \sqrt{(R_{oj}^2) - \left(\frac{R_n}{SR}\right)^2}.$$

16. The method of producing a two-dimensional probability density function eye diagram array as recited in claim 15 wherein the determining of a slew rate for the maximum slope location in the correlated waveform record data pattern step further comprises the step of calculating a straight line through the acquired multiple record samples for the uncorrelated horizontal waveform record of the data pattern under test.

17. The method of producing a two-dimensional probability density function eye diagram array as recited in claim 15 wherein the integrating of the horizontal signal content spectra containing the random components of the uncorrelated horizontal waveform record of the data pattern under test further comprises the steps of:
  a) identifying the horizontal signal content of the periodic components in the spectra of the uncorrelated horizontal waveform record of the data pattern under test; and
  b) removing the horizontal signal content of the periodic components in the spectra of the uncorrelated horizontal waveform record of the data pattern under test.

18. The method of producing a two-dimensional probability density function eye diagram array as recited in claim 15 further comprising the steps of:
  a) comparing the periodic components in the spectra of the uncorrelated horizontal waveform record to the periodic components in the spectra of the uncorrelated vertical waveform record to identify periodic vertical components in the spectra of the uncorrelated horizontal waveform record;
  b) removing the identified periodic vertical components in the spectra of the uncorrelated horizontal waveform record from the spectra of the uncorrelated horizontal waveform record;
  c) generating an amplitude voltage waveform of the vertical signal content spectra containing the periodic components of the uncorrelated vertical waveform record of the data pattern under test by performing an Inverse Fast Fourier Transform on the vertical signal content of the periodic component spectra;
  d) generating a histogram of the amplitude voltage waveform of the vertical signal content of the periodic component spectra representing the periodic noise in the data pattern under test;
  e) convolving a Gaussian distribution function having the calculated standard deviation of the random noise and the histogram of the periodic noise to generate the one-dimensional uncorrelated vertical probability density function array of the uncorrelated vertical signal content in the uncorrelated vertical waveform record representing the noise in the data pattern under test;

f) generating an amplitude voltage waveform of the horizontal signal content spectra containing the periodic components of the uncorrelated horizontal waveform record of the data pattern under test by performing an Inverse Fast Fourier Transform on the horizontal signal content of the periodic component spectra;

g) generating a histogram of the amplitude voltage waveform of the horizontal signal content of the periodic component spectra representing the periodic jitter in the data pattern under test; and h) convolving a Gaussian distribution function having the calculated standard deviation of the random jitter and the histogram of the periodic jitter to generate the one-dimensional uncorrelated horizontal probability density function array of the uncorrelated horizontal waveform record representing the jitter in the data pattern under test.

19. The method of producing a two-dimensional probability density function eye diagram array as recited in claim 10 further comprising the steps of:

a) defining a center coordinate in the two-dimensional probability density function eye diagram array;

b) defining integrations paths between the center coordinate and each element of the two-dimensional probability density function eye diagram array;

c) summing the element values of the two-dimensional probability function eye diagram array intersecting each of the defined integration paths;

d) assigning the summed element value for each of the defined integration paths to the respective element of the two-dimensional probability density function eye diagram defining the integration path from the center coordinate; and e) generating a Bit Error Rate eye array from the summed element values.

20. A method of producing a two-dimensional Bit Error Rate eye array for use in a test and measurement instrument, comprising the steps of:

a) acquiring a correlated waveform record of a data pattern under test, said correlated waveform being acquired using an acquisition portion of said test and measurement instrument;

b) dividing the correlated waveform record data pattern into unit intervals;

c) generating a one-dimensional array of ideal 1's and 0's logical values for the unit intervals of the correlated waveform record;

d) generating a two-dimensional probability density function array of the correlated waveform record data pattern divided into unit intervals;

e) acquiring an uncorrelated vertical and horizontal waveform records of the data pattern under test at respective zero slope and maximum slope locations in the correlated waveform record data pattern;

f) generating a one-dimensional uncorrelated vertical probability density function array of uncorrelated vertical signal content in the uncorrelated vertical waveform record representing the noise in the data pattern under test;

g) generating a one-dimensional uncorrelated horizontal probability density function array of uncorrelated horizontal signal content in the uncorrelated horizontal waveform record representing the jitter in the data pattern under test;

h) multiplying the one-dimensional uncorrelated horizontal probability density function array by the one-dimensional uncorrelated vertical probability density function array to generate a two-dimensional probability density function array of the uncorrelated jitter and noise in the data pattern under test;

i) convolving the two-dimensional probability density function array of the correlated waveform record data pattern with the two-dimensional probability density function array of the uncorrelated jitter and noise in the data pattern under test to generate an aggregate two-dimensional probability density function of the correlated waveform record pattern with uncorrelated jitter and noise;

j) correlating the one-dimensional array of ideal 1's and 0's logical values for the unit intervals of the correlated waveform record with the unit intervals of the aggregate two-dimensional probability density function array of the correlated waveform record pattern with uncorrelated jitter and noise;

k) summing the unit intervals of the aggregate two-dimensional probability density function array of the correlated waveform record pattern with uncorrelated jitter and noise correlated with the ideal 1's logic values to generate a two-dimensional 1's probability density function eye array;

l) summing the unit intervals of the aggregate two-dimensional probability density function array of the correlated waveform record pattern with uncorrelated jitter and noise correlated with the ideal 0's logic values to generate a two-dimensional 0's probability density function eye array;

m) integrating the two-dimensional 1's probability density function eye array upward and downward to generate two-dimensional 1's upward and downward integration arrays;

n) integrating the two-dimensional 0's probability density function eye array downward and upward to generate two-dimensional 0's downward and upward integration arrays;

o) adding the two-dimensional 1's upward integration array with the two-dimensional 0's downward integration array;

p) adding the two-dimensional 1's upward and downward integration arrays with the two-dimensional 0's downward and upward integration arrays; and q) dividing each element of the added the two-dimensional 1's upward integration array and two-dimensional 0's downward integration array by the corresponding element of the two-dimensional added 1's upward and downward integration arrays and the two-dimensional 0's downward and upward integration arrays to generate a two-dimensional Bit Error Rate eye array.

21. A method of producing a two-dimensional probability density function eye diagram array for use in a test and measurement instrument, comprising the steps of:

a) acquiring a correlated waveform record of a data pattern under test, said correlated waveform being acquired by use of an acquisition portion of said test and measurement instrument;

b) dividing the correlated waveform record data pattern into unit intervals;

c) generating a one-dimensional array of ideal 1's and 0's logical values for the unit intervals of the correlated waveform record;

d) generating a two-dimensional probability density function array of the correlated waveform record data pattern;

e) determining the maximum slope location in the correlated waveform record data pattern as the maximum of the derivative of the correlated waveform record data pattern; and f) determining additional slope locations as a percentage of the maximum slope location;

g) periodically sampling the slope locations in the correlated waveform record data pattern to acquiring multiple sample records at each slope location for the uncorrelated horizontal waveform record of the data pattern under test;

h) determining a slew rate for each of the slope locations in the correlated waveform record data pattern using the multiple sample records for each slope location;

i) converting each amplitude value of the acquired multiple sample records for each slope location of the uncorrelated horizontal waveform record of the data pattern under test into time a value as a function of the amplitude value divided by the slew rate;

j) generating a spectra of the horizontal signal content of the uncorrelated horizontal waveform record of the data pattern under test at each slope location by performing a Fast Fourier Transform on the converted time values of each acquired multiple sample record wherein the spectra contains random and periodic components of the uncorrelated horizontal waveform record of the data pattern under test;

k) integrating the horizontal signal content spectra containing the random components of the uncorrelated horizontal waveform record of the data pattern under test at each slope location to determine standard deviations of the random components representing the observed random jitter in the in the data pattern under test at each slope location;

l) determining random jitter and random noise in the in the data pattern under test as a function of the observed random jitters and the slew rates at the slope locations in the correlated waveform record data pattern using the formula:

$$R_j = \sqrt{R_{oj}^2 - \left(\frac{R_n}{SR}\right)^2}$$

m) determining periodic jitter and periodic noise in the data pattern under test as a function of the observed random jitters and slew rates at the slope location in the correlated waveform record data pattern using the formula:

$$R_{oj} = \frac{P_n + P_j}{SR}$$

n) generating a one-dimensional uncorrelated vertical probability density function array from the calculated random and periodic noise representing the noise in the data pattern under test;

p) generating a one-dimensional uncorrelated horizontal probability density function array from the calculated random and periodic jitter representing the jitter in the data pattern under test;

q) multiplying the one-dimensional uncorrelated horizontal probability density function array by the one-dimensional uncorrelated vertical probability density function array to generate a two-dimensional probability density function array of the uncorrelated jitter and noise in the data pattern under test;

r) convolving the two-dimensional probability density function array of the correlated waveform record data pattern with the two-dimensional probability density function array of the uncorrelated jitter and noise in the data pattern under test to generate an aggregate two-dimensional probability density function array of the correlated waveform record pattern with uncorrelated jitter and noise;

s) correlating the one-dimensional array of ideal 1's and 0's logical values for the unit intervals of the correlated waveform record with the unit intervals of the aggregate two-dimensional probability density function array of the correlated waveform record pattern with uncorrelated jitter and noise;

t) summing the unit intervals of the aggregate two-dimensional probability density function array of the correlated waveform record pattern with uncorrelated jitter and noise correlated with the ideal 1's logic values to generate a two-dimensional 1's probability density function eye array;

u) summing the unit intervals of the aggregate two-dimensional probability density function array of the correlated waveform record pattern with uncorrelated jitter and noise correlated with the ideal 0's logic values to generate a two-dimensional 0's probability density function eye array; and v) adding the two-dimensional 1's probability density function eye array with the two-dimensional 0's probability density function eye array to generate a two-dimensional probability density function eye diagram array.

22. The method of producing a two-dimensional probability density function eye diagram array as recited in claim 21 further comprising the steps of:

a) defining a center coordinate element in the two-dimensional probability density function eye diagram array;

b) defining integrations paths between the center coordinate and each element of the two-dimensional probability density function eye diagram array;

c) summing the element values of the two-dimensional probability function eye diagram array intersecting each of the defined integration paths;

d) assigning the summed element value for each of the defined integration paths to the respective elements of the two-dimensional probability density function eye diagram defining the integration path from the center coordinate; and e) generating a Bit Error Rate eye array from the summed element values.

23. A method of producing a two-dimensional probability density function eye diagram, for use in a test and measurement instrument, comprising the steps of:

a) acquiring a correlated waveform record of a data pattern under test, said correlated waveform being acquired via an acquisition portion of said test and measurement instrument;

b) dividing the correlated waveform record data pattern into unit intervals;

c) generating a one-dimensional array of ideal 1's and 0's logical values for the unit intervals of the correlated waveform record;

d) generating a two-dimensional probability density function array of the correlated waveform record data pattern;

e) determining the maximum slope location in the correlated waveform record data pattern as the maximum of the derivative of the correlated waveform record data pattern; and f) determining additional slope locations as a percentage of the maximum slope location;

g) periodically sampling the slope locations in the correlated waveform record data pattern to acquiring multiple sample records at each slope location for the uncorrelated horizontal waveform record of the data pattern under test;

h) determining a slew rate for each of the slope locations in the correlated waveform record data pattern using the multiple sample records for each slope location;

i) converting each amplitude value of the acquired multiple sample records for each slope location of the uncorrelated horizontal waveform record of the data pattern under test into time a value as a function of the amplitude value divided by the slew rate;

j) generating a spectra of the horizontal signal content of the uncorrelated horizontal waveform record of the data pattern under test at each slope location by performing a Fast Fourier Transform on the converted time values of each acquired multiple sample record wherein the spectra contains random and periodic components of the uncorrelated horizontal waveform record of the data pattern under test;

k) integrating the horizontal signal content spectra containing the random components of the uncorrelated horizontal waveform record of the data pattern under test at each slope location to determine standard deviations of the random components representing the observed random jitter in the in the data pattern under test at each slope location;

l) determining random jitter and random noise in the in the data pattern under test as a function of the observed random jitters and the slew rates at the slope locations in the correlated waveform record data pattern using the formula:

$$R_j = \sqrt{R_{oj}^2 - \left(\frac{R_n}{SR}\right)^2}$$

m) determining periodic jitter and periodic noise in the data pattern under test as a function of the observed random jitters and slew rates at the slope location in the correlated waveform record data pattern using the formula:

$$R_{oj} = \frac{P_n + P_j}{SR}$$

n) generating a one-dimensional uncorrelated vertical probability density function array from the calculated random and periodic noise representing the noise in the data pattern under test;

p) generating a one-dimensional uncorrelated horizontal probability density function array from the calculated random and periodic jitter representing the jitter in the data pattern under test;

q) multiplying the one-dimensional uncorrelated horizontal probability density function array by the one-dimensional uncorrelated vertical probability density function array to generate a two-dimensional probability density function array of the uncorrelated jitter and noise in the data pattern under test;

r) convolving the two-dimensional probability density function array of the correlated waveform record data pattern with the two-dimensional probability density function array of the uncorrelated jitter and noise in the data pattern under test to generate an aggregate two-dimensional probability density function array of the correlated waveform record pattern with uncorrelated jitter and noise;

s) correlating the one-dimensional array of ideal 1's and 0's logical values for the unit intervals of the correlated waveform record with the unit intervals of the aggregate two-dimensional probability density function array of the correlated waveform record pattern with uncorrelated jitter and noise;

t) summing the unit intervals of the aggregate two-dimensional probability density function array of the correlated waveform record pattern with uncorrelated jitter and noise correlated with the ideal 1's logic values to generate a two-dimensional 1's probability density function eye array;

u) summing the unit intervals of the aggregate two-dimensional probability density function array of the correlated waveform record pattern with uncorrelated jitter and noise correlated with the ideal 0's logic values to generate a two-dimensional 0's probability density function eye array;

v) integrating the two-dimensional 1's probability density function eye array upward and downward to generate two-dimensional 1's upward and downward integration arrays;

w) integrating the two-dimensional 0's probability density function eye array downward and upward to generate two-dimensional 0's downward and upward integration arrays;

x) adding the two-dimensional 1's upward integration array with the two-dimensional 0's downward integration array;

y) adding the two-dimensional 1's upward and downward integration arrays with the two-dimensional 0's downward and upward integration arrays; and z) dividing each element of the added the two-dimensional 1's upward integration array and two-dimensional 0's downward integration array by the corresponding element of the added two-dimensional 1's upward and downward integration arrays and the two-dimensional 0's downward and upward integration arrays to generate a two-dimensional Bit Error Rate eye array.

24. A method of producing a two-dimensional probability density function eye diagram, for use in a test and measurement instrument, comprising the steps of:

a) acquiring a correlated waveform record of a data pattern under test, said correlated waveform being acquired using an acquisition portion of said test and measurement instrument;

b) generating a two-dimensional probability density function array of the correlated waveform record data pattern;

c) determining the maximum slope location in the correlated waveform record data pattern as the maximum of the derivative of the correlated waveform record data pattern; and d) determining additional slope locations as a percentage of the maximum slope location;

e) periodically sampling the slope locations in the correlated waveform record data pattern to acquiring multiple sample records at each slope location for the uncorrelated horizontal waveform record of the data pattern under test;

f) determining a slew rate for each of the slope locations in the correlated waveform record data pattern using the multiple sample records for each slope location;

g) converting each amplitude value of the acquired multiple sample records for each slope location of the uncorrelated horizontal waveform record of the data pattern under test into time a value as a function of the amplitude value divided by the slew rate;

h) generating a spectra of the horizontal signal content of the uncorrelated horizontal waveform record of the data pattern under test at each slope location by performing a Fast Fourier Transform on the converted time values of each acquired multiple sample record wherein the spectra contains random and periodic components of the uncorrelated horizontal waveform record of the data pattern under test;

i) integrating the horizontal signal content spectra containing the random components of the uncorrelated horizontal waveform record of the data pattern under test at each slope location to determine standard deviations of the random components representing the observed random jitter in the in the data pattern under test at each slope location;

j) determining random jitter and random noise in the in the data pattern under test as a function of the observed random jitters and the slew rates at the slope locations in the correlated waveform record data pattern using the formula:

$$R_j = \sqrt{R_{oj}^2 - \left(\frac{R_n}{SR}\right)^2}$$

k) determining periodic jitter and periodic noise in the data pattern under test as a function of the observed random jitters and slew rates at the slope location in the correlated waveform record data pattern using the formula:

$$R_{oj} = \frac{P_n + P_j}{SR}$$

l) generating a one-dimensional uncorrelated vertical probability density function array from the calculated random and periodic noise representing the noise in the data pattern under test;

m) generating a one-dimensional uncorrelated horizontal probability density function array from the calculated random and periodic jitter representing the jitter in the data pattern under test;

n) multiplying the one-dimensional uncorrelated horizontal probability density function array by the one-dimensional uncorrelated vertical probability density function array to generate a two-dimensional probability density function array of the uncorrelated jitter and noise in the data pattern under test;

o) convolving the two-dimensional probability density function array of the correlated waveform record data pattern with the two-dimensional probability density function array of the uncorrelated jitter and noise in the data pattern under test to generate an aggregate two-dimensional probability density function array of the correlated waveform record pattern with uncorrelated jitter and noise; and p) dividing the aggregate two-dimensional probability density function array of the correlated waveform record pattern with uncorrelated jitter and noise into unit intervals and summing the unit intervals of the aggregate two-dimensional probability density function array of the correlated waveform record pattern with uncorrelated jitter and noise to generate a two-dimensional probability density function eye diagram array.

25. The method of producing a two-dimensional probability density function eye diagram array as recited in claim 24 further comprising the steps of:

a) defining a center coordinate element in the two-dimensional probability density function eye diagram array;

b) defining integrations paths between the center coordinate and each element of the two-dimensional probability density function eye diagram array;

c) summing the element values of the two-dimensional probability function eye diagram array intersecting each of the defined integration paths;

d) assigning the summed element value for each of the defined integration paths to the respective elements of the two-dimensional probability density function eye diagram defining the integration path from the center coordinate; and e) generating a Bit Error Rate eye array from the summed element values.

* * * * *